US012594222B2

(12) United States Patent
Bernard

(10) Patent No.: US 12,594,222 B2
(45) Date of Patent: Apr. 7, 2026

(54) ENTERAL FEEDING ADAPTERS AND METHODS OF USING THE ENTERAL FEEDING ADAPTERS

(71) Applicant: SOCIETE DES PRODUITS NESTLE S.A., Vevey (CH)

(72) Inventor: Steven Bernard, Eden Prairie, MN (US)

(73) Assignee: Societe des Produits Nestle S.A., Vevey (CH)

( * ) Notice: Subject to any disclaimer, the term of this patent is extended or adjusted under 35 U.S.C. 154(b) by 1180 days.

(21) Appl. No.: 17/280,335

(22) PCT Filed: Sep. 30, 2019

(86) PCT No.: PCT/EP2019/076390
§ 371 (c)(1),
(2) Date: Mar. 26, 2021

(87) PCT Pub. No.: WO2020/070044
PCT Pub. Date: Apr. 9, 2020

(65) Prior Publication Data

US 2022/0031574 A1 Feb. 3, 2022

Related U.S. Application Data

(60) Provisional application No. 62/739,625, filed on Oct. 1, 2018.

(51) Int. Cl.
*A61J 15/00* (2006.01)
*A61J 1/20* (2006.01)

(52) U.S. Cl.
CPC ........... *A61J 15/0015* (2013.01); *A61J 1/201* (2015.05); *A61J 1/2065* (2015.05); *A61J 1/2072* (2015.05); *A61J 15/0096* (2013.01)

(58) Field of Classification Search
CPC .... A61J 15/0015; A61J 15/0026; A61J 1/201; A61J 1/2065; A61J 1/2072;
(Continued)

(56) References Cited

U.S. PATENT DOCUMENTS

| | | | | |
|---|---|---|---|---|
| 5,377,854 A * | 1/1995 | Cusack | ................ | B65D 51/241 |
| 7,955,317 B2 * | 6/2011 | Fournie | ................. | A61M 39/26 604/533 |

(Continued)

FOREIGN PATENT DOCUMENTS

| | | |
|---|---|---|
| DE | 19905644 A1 | 8/2000 |
| EP | 1352843 | 10/2003 |
| JP | 2006181345 A | 7/2006 |

OTHER PUBLICATIONS

Japanese Office Action for Appl No. 2024-021740 dated Oct. 1, 2024, 4 pages.

(Continued)

*Primary Examiner* — Michael J Tsai
*Assistant Examiner* — Kathleen Paige Farrell
(74) *Attorney, Agent, or Firm* — K&L Gates LLP

(57) ABSTRACT

An adapter is provided for connecting a container of flowable material, such as enteral feed formula in a laminated paper container, to a feeding tube to enable bolus feeding. The adapter can transfer the flowable material from the container by piercing the container and/or a cover of the container. The adapter can form a fluid-tight friction seal on the container. In some embodiments, the adapter has a reusable tube vent long enough to be positioned in the air gap of the container when the container is inverted by a user.

10 Claims, 30 Drawing Sheets

(58) Field of Classification Search
CPC ...... A61J 15/0096; A61J 1/20; A61J 15/0076; A61J 1/2096; A61J 15/0003; A61J 15/00; A61J 1/2075; A61J 1/2089; A61J 15/0092; A61J 15/0011; A61M 5/1782; A61M 39/10; A61M 2039/1077; A61M 2039/1033; A61M 39/1011; A61M 2039/1094; A61M 2202/0482; A61M 5/162
See application file for complete search history.

(56) References Cited

U.S. PATENT DOCUMENTS

| | | | | |
|---|---|---|---|---|
| 2003/0226855 | A1 | 12/2003 | Allanson et al. | |
| 2004/0104246 | A1 * | 6/2004 | Kawaguchi | B65D 5/746 222/83 |
| 2013/0211375 | A1 * | 8/2013 | Tennican | A61M 5/31596 |
| 2017/0021156 | A1 * | 1/2017 | Kraus et al. | A61J 1/2072 |
| 2017/0312181 | A1 * | 11/2017 | Davis et al. | A61M 39/10 |
| 2018/0036204 | A1 * | 2/2018 | Sund et al. | A61J 1/2096 |
| 2018/0126094 | A1 * | 5/2018 | Reid | A61J 15/0026 |
| 2018/0344571 | A1 * | 12/2018 | Cowan et al. | A61J 1/2075 |
| 2019/0388671 | A1 * | 12/2019 | Rao et al. | A61J 15/0096 |
| 2020/0146936 | A1 * | 5/2020 | Davies | A61J 7/0053 |

OTHER PUBLICATIONS

Japanese Office Action for Appl No. 2024-021740 dated Mar. 25, 2025, 8 pages.

* cited by examiner

ENTERAL FEEDING ADAPTERS AND METHODS OF USING THE ENTERAL FEEDING ADAPTERS

CROSS REFERENCE TO RELATED APPLICATIONS

The present application is a National Stage of International Application No. PCT/EP2019/076390, filed on Sep. 30, 2019, which claims priority to U.S. Provisional Patent Application No. 62/739,625, filed on Oct. 1, 2018, the entire contents of which are being incorporated herein by reference.

BACKGROUND

The present disclosure relates generally to an adapter for connecting a container of flowable material, such as enteral feed formula, to a feeding tube to enable bolus feeding. The adapter can transfer the flowable material from the container by piercing the container and/or a cover of the container or, additionally or alternatively, by connecting to a neck of the container by a screw thread and/or a flexible material that seals over the outside of the neck.

Many individuals in hospitals or nursing homes cannot orally take nourishment or medication. These individuals typically receive enteral administration of flowable materials containing the required nourishment and/or medication. For example, a patient feeding line (e.g., a gastrostomy feeding tube) can be connected to a container containing such medical or nutritional flowable materials using an enteral administration set. These medical or nutritional flowable materials are commonly packaged in flexible containers, such as flexible pouches. For economical and other reasons, such pouches are disadvantageous.

Containers, such as Tetra Brik® and Tetra Prism®, are used in the food industry. They provide a convenient cost-effective and lightweight paperboard container for every type of pourable product, such as liquids. They exist in a variety of sizes, for example from 0.2 liter to 1.5 liter, or even larger. They are opaque and thus are perfect for light-sensitive enterally administrable compositions, for example compositions containing vitamins. With regard to medical fluids to be administered to a patient, these fluids typically need to be sterile. Containers may be sterilized and therefore may keep even the most perishable liquid foods fresh and nutritious for months without refrigeration or added preservatives. Finally, the containers may be aseptically and air tightly closed, preventing contaminants and/or oxygen from entering the container. Such containers may be advantageously used to contain pharmaceutical or nutritional compositions, e.g. enteral medical or nutritional fluids.

However, the existing enteral feeding lines are not adapted to being connected, e.g. directly connected, to the existing containers. Consequently, medical or nutritional compositions, e.g. fluids, are often poured into an intermediate container, such as a syringe, which is then connected to the feeding line. This transfer to the intermediate container is inconvenient for patients and medical personnel and requires strength and dexterity. Moreover, sterility during this process is difficult to ensure; for example, transfer of the flowable material has the risk of leakage and exposure of the flowable material to the surroundings.

SUMMARY

The present inventors developed embodiments of an adapter that are advantageous relative to adapters known at the time of the inventions disclosed herein. These embodiments of an adapter provide an easier and cleaner bolus feed to a patient, for example through a gastronomy tube (G-tube).

In a first embodiment, the present disclosure provides an adapter for fluidly connecting a syringe to a container (e.g., a laminated paper container) containing a composition, the syringe coupled to an enteral feeding line. The adapter comprises: a body comprising a bottom end that defines an opening and a spike; a fluid exit port extending from a top end of the body, the top end facing an opposite direction from the bottom end, the body comprising an internal chamber that fluidly connects the opening to the fluid exit port, the fluid exit port configured to transfer the composition to the syringe coupled to the enteral feeding line; and one or more interface surfaces extending radially from the body, the one or more interface surfaces optionally comprise ribs configured to create a gap between the syringe and a portion of the body between the ribs when the adapter is inserted into the syringe. Preferably the one or more interface surfaces provide a support for the container to be independently retained in the syringe without user interaction when the container is inverted.

In an embodiment, the bottom end comprises a wall that forms the spike and also defines at least a portion of the opening.

In an embodiment, the opening lies in a plane positioned at an angle between ten degrees and eighty degrees relative to at least one of (i) a side wall of the body or (ii) a longitudinal axis of the body.

In an embodiment, the body is cylindrical.

In an embodiment, at least a portion of the body is transparent.

In an embodiment, an enteral administration kit comprises the adapter and further comprises at least one of (i) the container containing the composition or (ii) the syringe.

In an embodiment, the present disclosure provides a method of providing enteral nutrition from a container (e.g., a laminated paper container), the container comprising a pre-formed hole into an interior of the container. The method comprises: connecting an adapter (e.g., the first embodiment of the adapter) to the container, the connecting of the adapter to the container comprises pressing a spike of the adapter through the pre-formed hole in the container; inverting the container with the adapter attached thereto, and optionally the adapter comprises one or more interface surfaces that provide a support for the container to be independently retained in the syringe without user interaction when the container is inverted; inserting an end of the adapter opposite from the spike into a syringe, the inserting of the end of the adapter into the syringe fluidly connects the interior of the container to the syringe through (i) an internal chamber of the adapter and (ii) a fluid exit port at the end of the adapter inserted into the syringe; and directing at least a portion of a composition in the container through the adapter and then through the syringe into an enteral feeding line having a first end attached to the syringe, and a second end of the enteral feeding line is positioned in a patient.

Preferably, the spike is larger in at least one dimension than the pre-formed hole, and the pressing of the spike of the adapter through the pre-formed hole expands the hole in at least one direction.

The method can comprise applying pressure to at least one lateral side of the container to direct at least a portion of the composition in the container through the adapter. The pressure can be applied to two opposite lateral sides of the container by squeezing the container.

In an embodiment, the directing of the composition in the container through the adapter is at least partially by gravity (e.g., completely by gravity in some embodiments).

In an embodiment, the adapter is connected to the container solely by a friction fit between the adapter and the expanded hole of the container, and the friction fit forms a fluid-tight seal on the expanded hole.

In an embodiment, the method comprises venting air through a gap between a body of the adapter and an inner surface of the syringe while the composition is directed through the adapter, wherein the body of the adapter comprises the spike, and the gap is formed by one or more interface surfaces extending from the body of the adapter, and optionally the one or more interface surfaces are selected from the group consisting of (i) vertical ribs extending from the body of the adapter and (ii) a sleeve circumscribing the body of the adapter.

In an embodiment, the method comprises engaging one or more stop surfaces of the adapter with the container such that the one or more stop surfaces abut the laminated paper to stop the pressing of the spike of the adapter through the pre-formed hole in the container.

In an embodiment, the adapter has at least one opening such that when the adapter is assembled to the container, the at least one opening of the adapter is inside the interior of the container and adjacent a seal formed between the adapter and the container, the at least one opening allows the inverting of the container with the adapter attached thereto to substantially drain the container. The total area of the at least one opening of the adapter preferably comprises an area of at least 50% of the smallest flow path area of the fluid port of the adapter to allow for efficient gravity flow. The at least one opening preferably comprises a portion (e.g., a small portion, such as a portion of reduced width) nearest to the seal and comprising an area at least 60% less than the total area of the at least one opening to provide a slow indicator leak to the outside if the adapter is partially removed while inverted.

In an embodiment, the method further comprises pausing administration of the enteral nutrition from the container to the patient, the pausing comprising disconnecting the adapter the container and/or the feeding tube, the method further comprising covering the container and/or capping the adapter, the method further comprising refrigerating the container and then resuming the administration of the enteral nutrition from the container to the patient.

In an embodiment, the present disclosure provides a method of providing enteral nutrition from a container, the container comprising a pre-formed hole into an interior of the container, the method comprising: connecting an adapter (e.g., the first embodiment of the adapter) to the container, the connecting of the adapter to the container comprises pressing a spike of the adapter through the pre-formed hole in the container, the spike is larger in at least one dimension than the pre-formed hole, the pressing of the spike of the adapter through the pre-formed hole expands the hole in at least one direction; and inverting the container with the adapter attached thereto, wherein the inverting of the container directs at least a portion of a composition in the container through the adapter and then into an enteral feeding line having a first end attached to the adapter, and a second end of the enteral feeding line is positioned in a patient.

In an embodiment, the method comprises fluidly connecting the adapter to the enteral feeding line before and/or after the connecting of the adapter to the container.

In a second embodiment, the present disclosure provides an adapter for fluidly connecting a syringe to a container (e.g., a laminated paper container) containing a composition, the syringe coupled to an enteral feeding line. The adapter comprises: a body comprising a bottom end that defines an opening; a fluid exit port extending outward from a top end of the body, the top end facing an opposite direction from the bottom end, the body comprising an internal chamber that fluidly connects the opening to the fluid exit port, the fluid exit port configured to sealingly attach to the enteral feeding line; and a vent tube extending outward from the top end of the body at a different position than the fluid exit port, the vent tube also extending inward through the internal chamber to a point beyond a bottom end of the body, a bottom end of the vent tube comprises an opening that defines a first spike, and the bottom end of the body defines a second spike.

In an embodiment, a top end of the vent tube comprises a port configured to be connected to a cap and/or a flexible tube; in some embodiments, a stylet can be inserted in the port before inversion of the container and then removed after inversion of the container.

In an embodiment, the vent tube has a total length that is about 1.5 to about 3.0 times as long as a height of the body.

In an embodiment, the body comprises at least one wall that has an inner surface defining at least part of the internal chamber and an outer surface that is an outer surface of the body.

In an embodiment, a kit comprises the adapter and further comprises the container containing the composition.

In an embodiment, the present disclosure provides a method of providing enteral nutrition from a container (e.g., a laminated paper container), the container comprising a cover covering a pre-formed hole into the container. The method comprises: connecting an adapter to the container, the adapter comprising a vent tube and a first spike provided by the vent tube, the connecting of the adapter to the container comprises pressing the first spike of the adapter through the cover of the container to insert through the pre-formed hole, the connecting of the adapter to the container comprises continuing to press the adapter such that a second spike of the adapter inserts through the pre-formed hole, the second spike is larger in at least one dimension than the pre-formed hole, the pressing of the second spike of the adapter through the pre-formed hole expands the hole in at least one direction; and inverting the container with the adapter attached thereto, and the inverting of the container directs at least a portion of a composition in the container through the adapter into an enteral feeding line having a first end attached to the adapter, and a second end of the enteral feeding line is positioned in a patient.

In an embodiment, the adapter is connected to the container solely by a friction fit between the adapter and the expanded hole of the container, and the friction fit forms a fluid-tight seal on the expanded hole.

In an embodiment, the method comprises engaging one or more stop surfaces of the adapter with the container such that the one or more stop surfaces abut the laminated paper to stop the pressing of the second spike of the adapter through the pre-formed hole in the container. The position of the adapter with the one or more stop surfaces of the adapter abutting the container can also position the end of the vent tube comprising the first spike in an air gap formed when the container is inverted (e.g., a head space of the container). Additionally or alternatively, the vent tube can be inserted separately, for example in a position extending partially or fully to the bottom of the container (e.g., a modular embodiment of the adapter for which the method can comprise attaching the adapter to the container and attaching the vent tube to the adapter as separate steps). In some embodiments, the vent tube can be inserted partially into the container to provide venting after a volume of the liquid in the container has been removed by squeezing the container.

Optionally the adapter can comprise a chamber having a volume which increases the air gap when inverted, thus minimizing the required length of the vent tube.

In an embodiment, the method further comprises plugging the vent tube to prevent fluid from entering the vent tube before administration of the composition to the patient.

In an embodiment, the present disclosure provides a method of providing enteral nutrition from a container, the container comprising a neck comprising one or more threads circumscribing a pre-formed hole in the container, the method comprising: connecting an adapter to the container, the connecting of the adapter to the container comprises connecting a component of the adapter to the container to thereby insert a vent tube of the adapter through the pre-formed hole, the component is selected from the group consisting of (i) one or more threads on the adapter complementary to the one or more threads of the container, (ii) a flexible material which seals over the outside of the neck of the container, and (iii) a combination thereof; and inverting the container with the adapter attached thereto, and the inverting of the container directs at least a portion of a composition in the container through the adapter into an enteral feeding line having a first end attached to the adapter, and a second end of the enteral feeding line is positioned in a patient.

Preferably a bottom end of the vent tube is distal from the one or more complementary threads, and the connecting of the adapter to the container positions the bottom end of the vent tube in an air gap formed when the container is inverted (e.g., a head space of the container).

The method can further comprise plugging the vent tube to prevent fluid from entering the vent tube before administration of the composition to the patient.

The vent tube can optionally comprise a port at the end of the vent tube opposite from the first spike. In an embodiment, a section of tubing can be connected to the vent tube (e.g., connected to the port) and can be transparent to allow visualization of fluid in the vent tube, and the tubing can include a cap, valve (e.g., butterfly valve) or roller clamp to adjust the vent and to meter the flow. In an embodiment, such fluid can be contained by a fluid trap (e.g., in a flexible tube on the vent port). An air reservoir, such as a flexible bulb or flexible tube, can be used by the user to clear the vent tube with a volume of air if nutrition has entered the vent. A stylet can be used to plug the vent passage until feeding is about to begin to thereby prevent fluid from inadvertently entering the vent passage. The stylet can be partially or fully removed in order to adjust the vent and/or to meter flow.

An advantage of one or more embodiments provided by the present disclosure is a spike configuration that can be sharp enough to pierce the foil of the container with moderate force without being dangerous to handle or ship, can be large enough to create an adequate flow path area, can be shaped to create a foil flap regardless of puncture location, can be long enough to clear the opened foil flap, and can be small enough to avoid displacing the composition outside of the container, such as onto any adhesive pad.

Another advantage of one or more embodiments provided by the present disclosure is an enteral nutrition adapter that easily connects to an enteral feeding tube.

Yet another advantage of one or more embodiments provided by the present disclosure is a vent membrane or material that prevents fluid flow out of the container, allows air to flow into the container, and is moldable at a low cost. The vent membrane or material may be positioned in the vent port and made to be optionally replaced by the user in order to reuse the adapter.

In a further advantage of one or more embodiments provided by the present disclosure, the fluid flow can be controlled by mechanically controlling the air flow into the vent, such as with a cap, a cam, a taper, a restriction, a pinch clamp, and/or a roller clamp. A portion of the stylet could also be reduced or tapered to further adjust the vent and to meter flow as the stylet is manipulated (such as withdrawn or rotated) by the user.

Moreover, another advantage of one or more embodiments provided by the present disclosure is an adhesive pad that seals to the foil and/or carton of an enteral nutrition container, for example by sealing across the nutrition on the surface of the container.

Additional features and advantages are described herein and will be apparent from the following Detailed Description and the Figures.

DETAILED DESCRIPTION

Definitions

Figure 1:
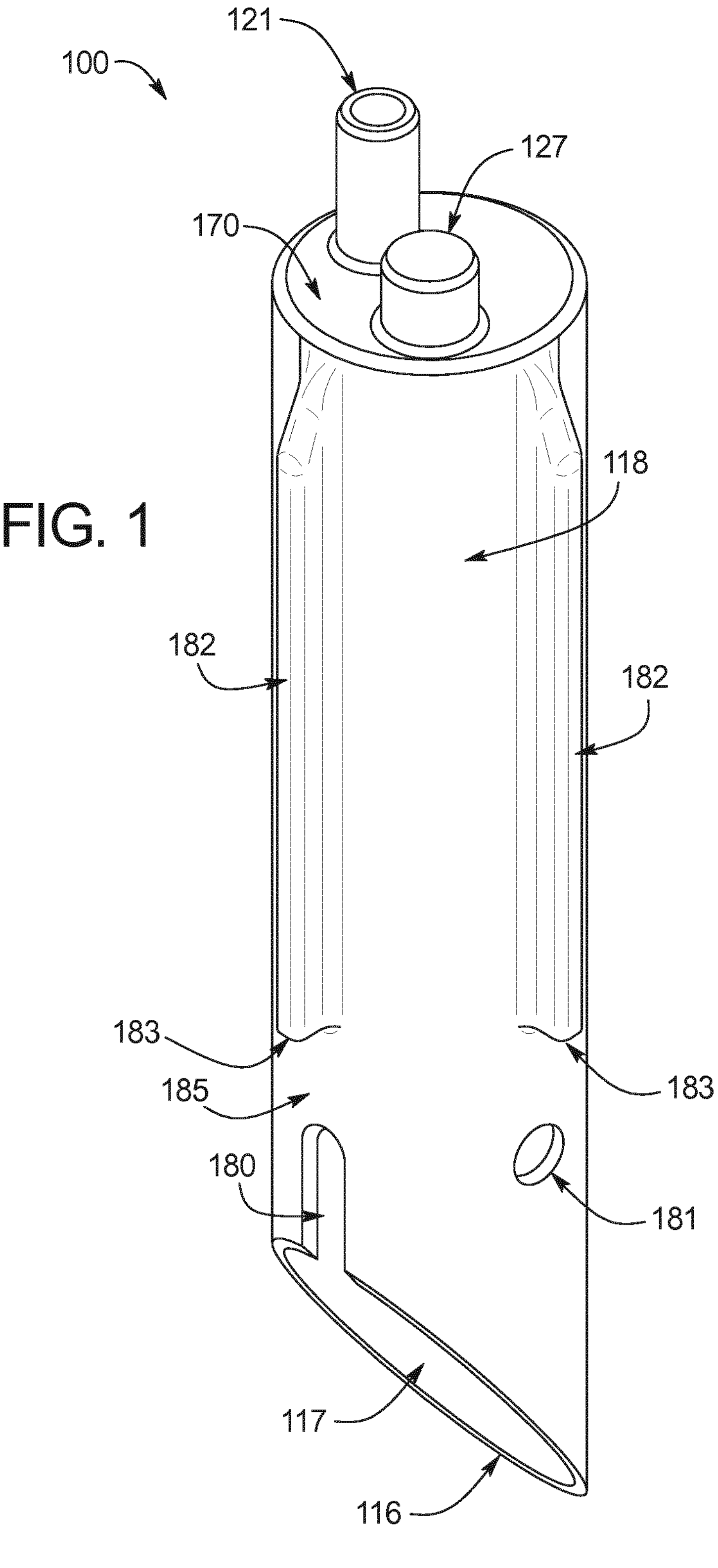
FIG. 1 is a side perspective view of a first embodiment of an adapter provided by the present disclosure.

Some definitions are provided hereafter. Nevertheless, definitions may be located in the "Embodiments" section below, and the above header "Definitions" does not mean that such disclosures in the "Embodiments" section are not definitions.

As used in this disclosure and the appended claims, the singular forms "a," "an" and "the" include plural referents unless the context clearly dictates otherwise. Thus, for example, reference to "a fluid" or "the fluid" includes two or more fluids.

The words "comprise," "comprises" and "comprising" are to be interpreted inclusively rather than exclusively. Likewise, the terms "include," "including" and "or" should all be construed to be inclusive, unless such a construction is clearly prohibited from the context.

Nevertheless, the devices and apparatuses disclosed herein may lack any element that is not specifically disclosed. Thus, a disclosure of an embodiment using the term "comprising" includes a disclosure of embodiments "consisting essentially of" and "consisting of" the components identified. Similarly, the methods disclosed herein may lack any step that is not specifically disclosed herein. Thus, a disclosure of an embodiment using the term "comprising" includes a disclosure of embodiments "consisting essentially of" and "consisting of" the steps identified.

The term "and/or" used in the context of "X and/or Y" should be interpreted as "X," or "Y," or "X and Y." Similarly, "at least one of X or Y" should be interpreted as "X," or "Y," or "X and Y." Where used herein, the terms "example" and "such as," particularly when followed by a listing of terms, are merely exemplary and illustrative and should not be deemed to be exclusive or comprehensive. Any embodiment disclosed herein can be combined with any other embodiment disclosed herein unless explicitly stated otherwise.

As used herein, "about" and "approximately" are understood to refer to numbers in a range of numerals, for example the range of −10% to +10% of the referenced number, preferably within −5% to +5% of the referenced number, more preferably within −1% to +1% of the referenced number, most preferably within −0.1% to +0.1% of the referenced number.

Numerical adjectives, such as "first" and "second," are merely used to distinguish components. These numerical adjectives do not imply the presence of other components, a relative positioning, or any chronological implementation. In this regard, the presence of a "second" structure does not imply that a "first" structure is necessarily present. Further in this regard, a "second" element can be obtained and/or used before, after, or simultaneously with any "first" element.

The term "enteral composition" means a flowable fluid composition that is formulated for ingestion by an individual such as a human and provides at least one nutrient or medication to the individual. The enteral composition preferably has a viscosity less than 150 cPs, more preferably less than 125 cPs, and most preferably less than 100 cPs. An enteral composition typically includes at least one of a protein, a lipid, a carbohydrate and optionally includes one or more vitamins and minerals. The compositions of the present disclosure, including the many embodiments described herein, can comprise, consist of, or consist essentially of the elements disclosed herein, as well as any additional or optional ingredients, components, or elements described herein or otherwise useful in a diet.

The term "laminated paper container" means a container having one or more layers of fibrous material, such as paper or cardboard, which are coated on either side with a thermoplastic material such as polyethylene. On the side of the laminated paper packaging material configured to contact with the composition, the container may further comprise a layer of barrier material, e.g., aluminum foil, which may optionally be coated with a thermoplastic layer. Non-limiting examples of containers are disclosed in U.S. Pat. No. 6,223,924 and in EP1088765, both hereby incorporated by reference in their entireties. Other non-limiting examples include containers of the type Tetra Brik®, Tetra Brik Aseptic®, Tetra Pak®, Tetra® Prisma, Tetra Recart®, Tetra Square®, Tetra Top®, Elopa®, Combiblok®, and Pure Pak®. The container may have a volume of about 0.125 liter to about 2 liters, preferably about 0.200 liter to about 1.0 liter, most preferably one of about 0.200 liter, about 0.250 liter, and about 1.0 liter.

As used herein, directions such as "top," "bottom," "side," "vertical" and "horizontal" are with reference the container in its resting position (e.g., not inverted), specifically that the hole in the container is the top of the container, and a similarly situated component is at the "top," and the opposite end of the container from the hole in the container is the "bottom," and a similarly situated component is at the "bottom."

As used herein, including the appended claims, a "kit" means that the identified components are physically associated in or with one or more containers and considered a unit for manufacture, distribution, sale or use. Suitable containers for physically associating a kit include, but are not limited to, bags, boxes, cartons, bottles, packages of any type or design or material, over-wrap, shrink-wrap, affixed components (e.g., stapled, adhered, or the like), or combinations thereof. A single package may be one or more containers that contain the identified components, and the one or more containers are physically associated such that they are considered a unit for manufacture, distribution, sale or use.

EMBODIMENTS

The embodiments of the adapter disclosed herein preferably connect an enteral feeding line (e.g., a G-tube) and a container (e.g., a laminated paper container). The adapter can direct an enteral composition contained in the container from the container into the enteral feeding line. In a preferred embodiment, the adapter forms a liquid-tight seal with the container at least temporarily such that the adapter prevents leakage of the composition when the composition is flowing through the adapter device, e.g., when a user has inverted the container to have its opening downward.

A first embodiment provided by the present disclosure is generally illustrated in FIGS. 1-19. In the first embodiment, an adapter 100 may connect an enteral feeding line 112 to a container 114, preferably a laminated paper container. The container 114 can be initially sealed by a cover 120, such as aluminum foil, and the cover 120 can initially overlay and/or seal a pre-formed hole 140 in the container 114. To allow administration of a composition 115 initially positioned in the interior of the container 114, e.g., a fluid such as an enteral composition, the cover 120 can be opened by the adapter 100 to establish a passageway from the interior of the container 114 through the adapter 100 into the enteral feeding line 112. Therefore, the adapter 100 can comprise a spike 116 for forming an opening in the container 114, such as a flap in the cover 120.

The cover 120 can comprise a pull-tab which can be removed from the remainder of the container 114 prior to connecting the adapter 100 to the container 114; for example, the cover 120 can be peeled off one or more surfaces of the container 114. However, instead the cover 120 is preferably opened by the spike 116 to form an opening in the cover 120, for example by piercing and/or tearing the cover 120. The present disclosure is not limited to a specific embodiment of the spike 116, and the spike 116 can be any structure configured to open the cover 120, for example by piercing and/or tearing the cover 120.

The adapter 100 can comprise a body 118 that is preferably at least partially hollow, preferably by comprising an internal chamber 122. For example, the body 118 can have one or more walls that each have (i) an outer surface that is an outer surface of the body 118 and (ii) an inner surface that defines at least a portion of the internal chamber 122.

Figure 8:
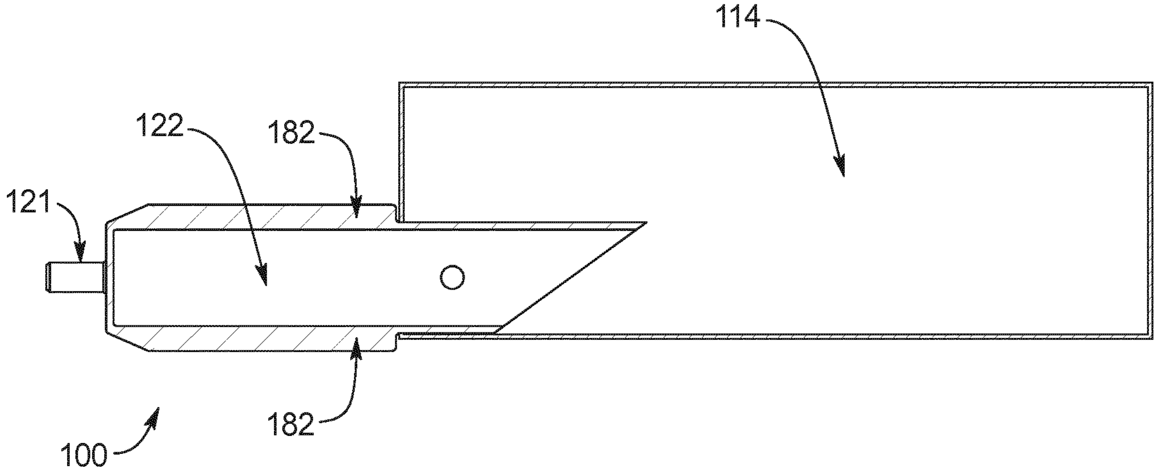
FIG. 8 is a side cross-section view of the first embodiment of the adapter attached to a container.
Figure 9:
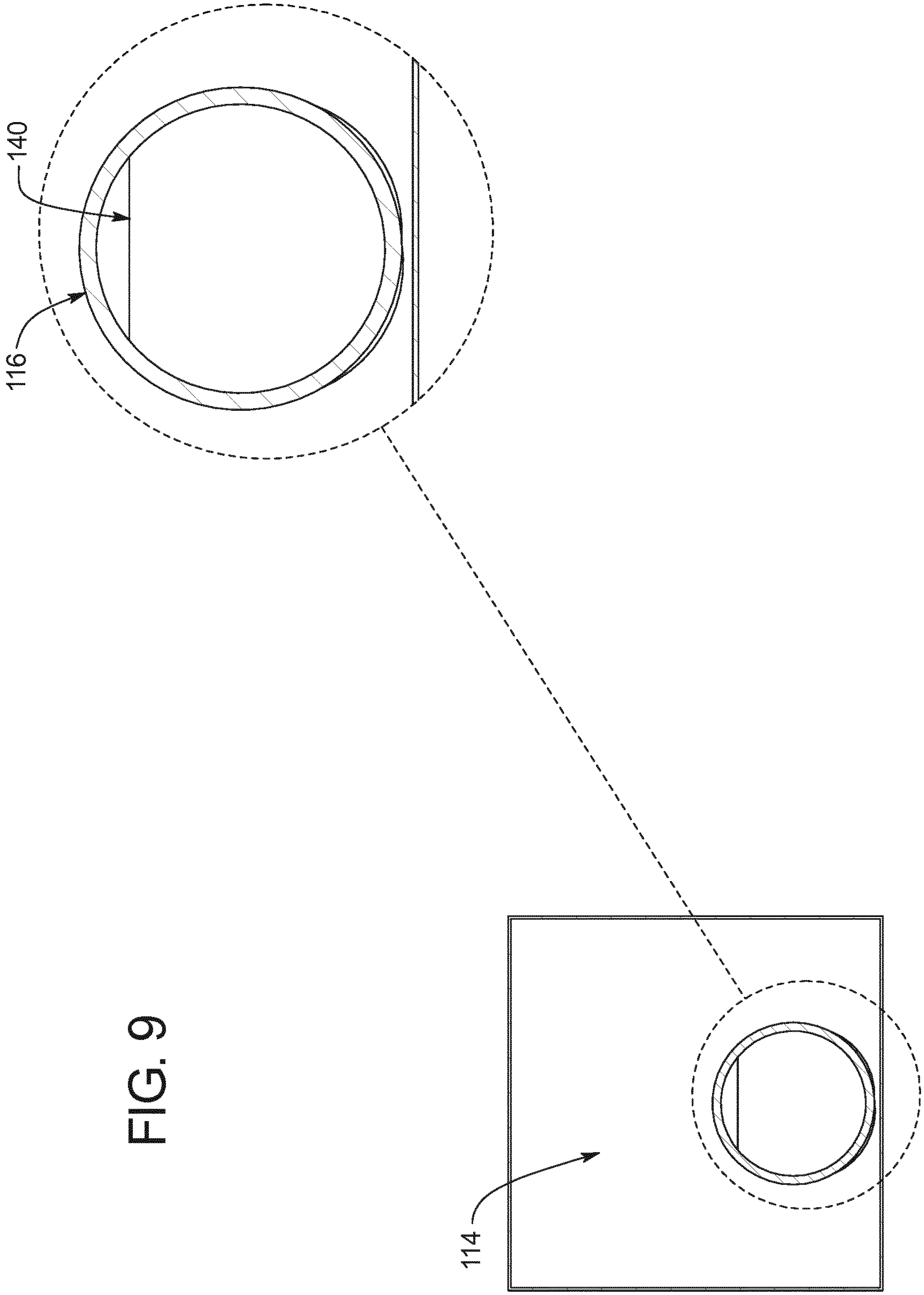
FIG. 9 is an above plan view comparing the spike profile of the first embodiment of the adapter to the hole in the container.

The spike 116 can be a part of the body 118, for example a bottom end 117 of the body 118 that also defines an opening into the internal chamber 122. The spike 116 preferably has a profile larger than the hole 140 in the container 114 into which the spike 116 is inserted (i.e., larger in at least one dimension). For example, the opening defined by the bottom end 117 of the body 118 can be in a plane that is angled relative to the side walls of the body 118 and/or the longitudinal axis of the body 118. As shown in FIG. 9, preferably the body 118 and/or the spike 116 have a cross-section perpendicular to the longitudinal axis that has a larger circumference (e.g., a larger radius) than that of the hole 140 in the container 114. Referring again to FIGS. 1-19, the body 118 is shown as being generally cylindrical, but the body 118 can be any shape, and the present disclosure is not limited to a specific shape of the body 118.

The opening in the bottom end 117 of the body 118 that forms the spike 116 preferably lies in a plane at an angle between ten degrees and eighty degrees relative to the side walls of the body 118 and/or the longitudinal axis of the body 118, more preferably at an angle between twenty degrees and seventy degrees relative to the side walls of the body 118 and/or the longitudinal axis of the body 118, most preferably at an angle between thirty degrees and sixty degrees relative to the side walls of the body 118 and/or the longitudinal axis of the body 118.

The body 118 can optionally comprise a drain slot 180, for example a slot in the body 118 extending upward from the bottom end 117 of the body 118. Additionally or alternatively, the body 118 can optionally comprise a drain hole 181, for example a hole extending through the body 118 adjacent to the bottom end 117 of the body 118.

The adapter 100 can further comprise one or more interface surfaces 182 that extend axially from the body 118, for example vertical ribs that extend from the body 118 of the adapter 100 and/or a sleeve circumscribing the body 118 of the adapter 100 (e.g., a transparent sleeve). The one or more interface surfaces 182 can abut the inner surface of a syringe 199 into which the adapter is at least partially inserted, as discussed in more detail later herein. Further in this regard, the body 118 can be distanced from the inner surface of the syringe 199 into which the adapter 100 is at least partially inserted, to form a vent gap 186 so that the syringe 199 can effectively drain. In an embodiment, the one or more interface surfaces 182 can taper outward to provide a more secure fit if the syringe 199 has a large diameter.

One or more stop surfaces 183 can slide into abutment with the top surface of the container 114 as the adapter 100 is continuously pushed into the container 114. Thus the stop surfaces 183 can prevent further pushing of the adapter 100 into the container 114.

In some embodiments, the one or more interface surfaces 182 can comprise the one or more stop surfaces 183. For example, an embodiment of the one or more interface surfaces 182 that comprises vertical ribs can comprise the stop surface 183 at the lower-most end of the rib. As another example, an embodiment of the one or more interface surfaces 182 that comprises a sleeve can comprise the stop surface 183 at the lower-most end of the sleeve. The one or more stop surfaces 183 can be part of the interface surfaces 182 (if any) or can be distinct structures.

A portion of the body 118 between the stop surfaces 183 and the opening in the bottom end 117 can form a fluid-tight seal and friction retention area 185 that engages the side of the hole in the container 114. In an embodiment, the fluid-tight seal and friction retention area 185 can optionally include a mechanical securing member selected from the group consisting of one or more barbs, one or more bumps, one or more fish gill structures, a rubber material, and combinations thereof. In an embodiment, a retention member can be applied to the top surface 170 of the adapter 100 to assist in securing the adapter 100 to the container 114, for example an elastic band extending from the top surface 170 of the adapter 100 to the bottom of the container 114.

Positioning the adapter 100 such that the one or more stop surfaces 183 abut the container 114 can force the spike 116 into and at least partially through the cover 120. The spike 116 can thus form an opening in the cover 120 and/or the container 114 to thereby establish a passageway for the enteral composition 115 from the interior of the container 114 through the adapter 100 into the enteral feeding line 112.

Figures 2A, 2B, 2C, 2D:
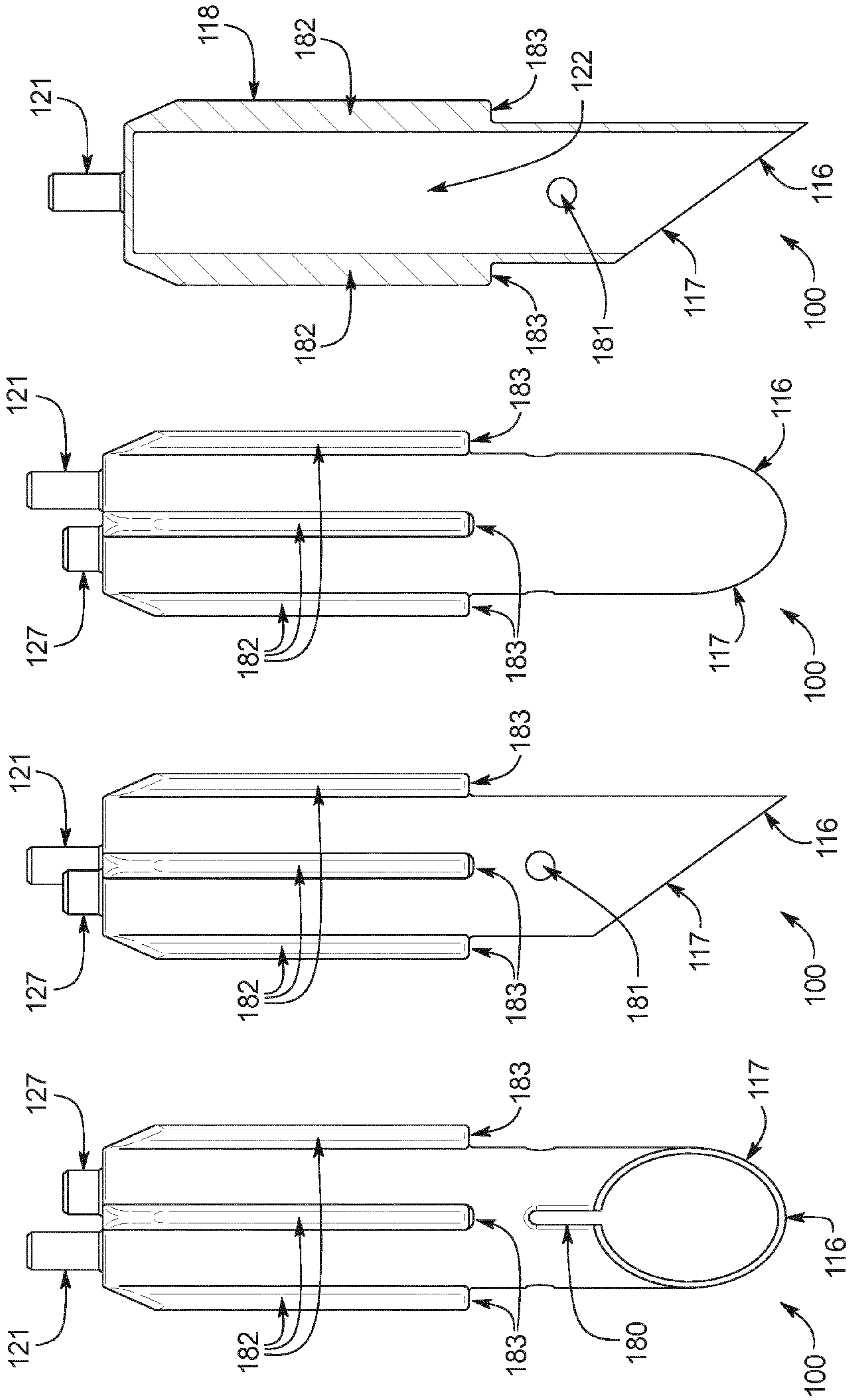
FIGS. 2A-2C are side plan views of the first embodiment of the adapter.
FIG. 2D is a side cross-section view of the first embodiment of the adapter.
Figures 3A, 3B, 3C, 3D:
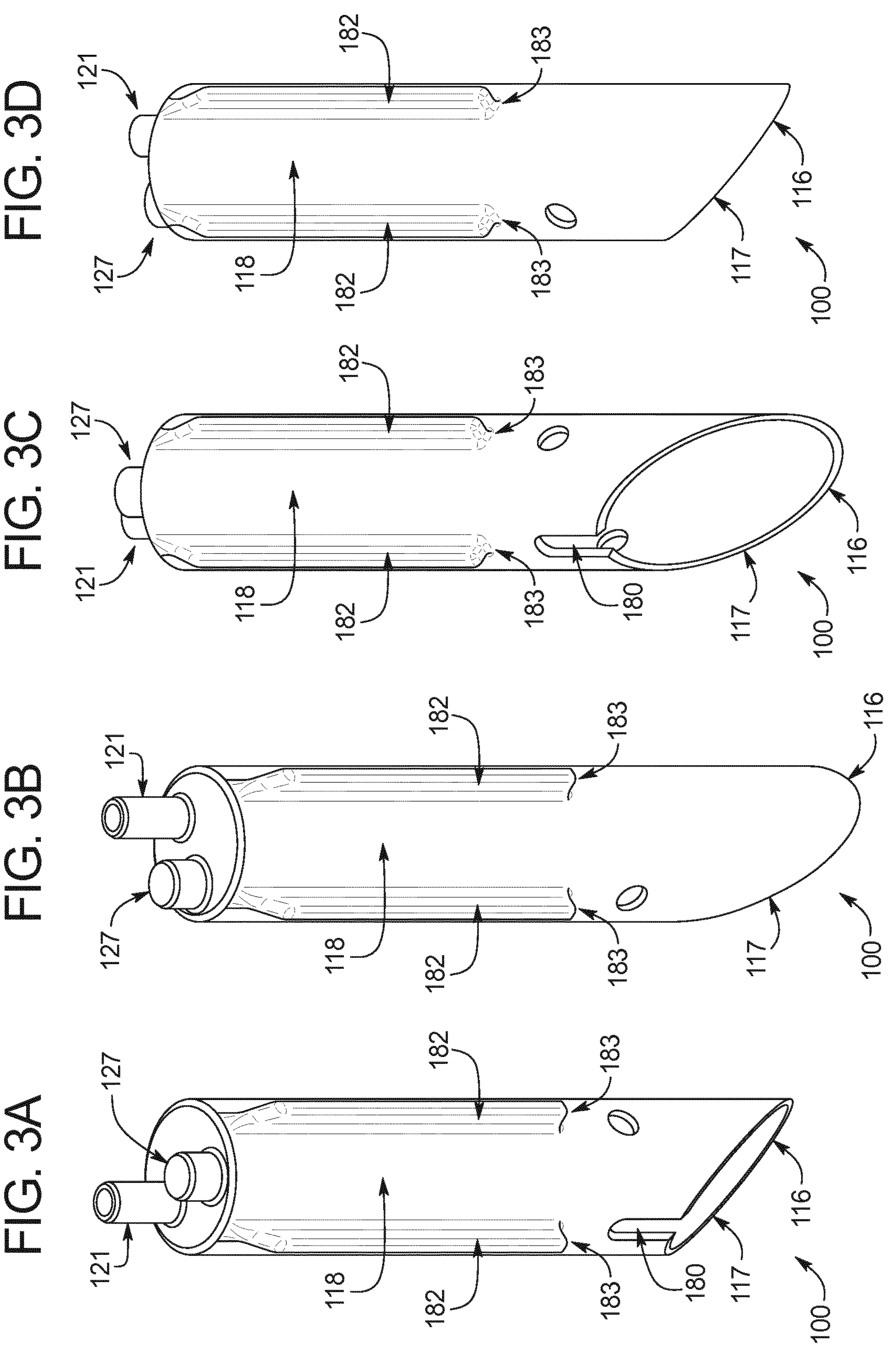
FIGS. 3A-3D are side perspective views of the first embodiment of the adapter.
Figure 4:
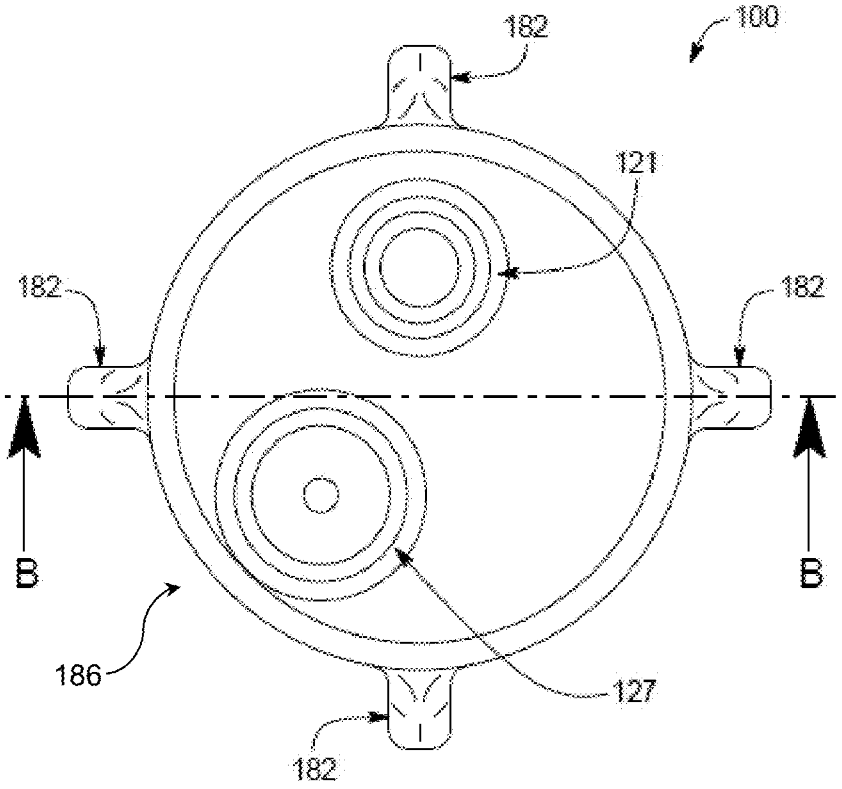
FIG. 4 is an above plan view of the first embodiment of the adapter and identifies the cross-section used in FIG. 2D.
Figure 5:
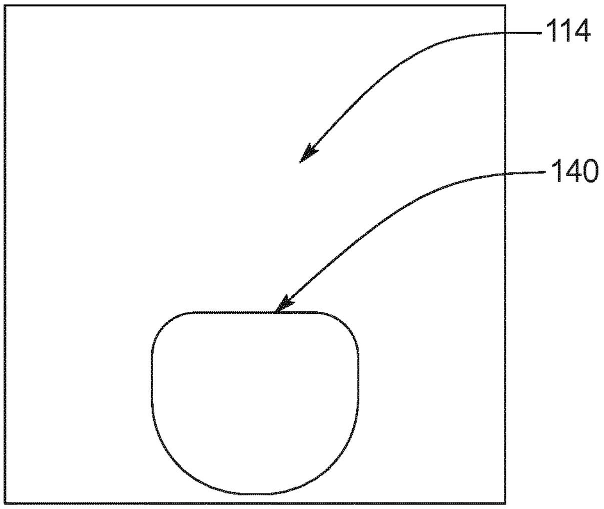
FIG. 5 is an above plan view of a container before subjecting it to the first embodiment of the adapter.

In this regard, the body 118 can comprise a fluid exit port 121 on the top surface 170 of the adapter 100; and the opening defined by the bottom end 117 of the body 118 can lead through the interior of the body 118 (e.g., through the internal chamber 122) to the fluid exit port 121 (particularly shown in FIG. 2D). The syringe 199 can fluidly connect the fluid exit port 121 of the adapter 100 to the enteral feeding line 112.

The adapter 100 can optionally comprise a vent port 127 configured to allow air to enter the interior of the container 114 (e.g., by travelling through the internal chamber 122) to compensate for the composition 115 exiting container 114 through the adapter 100. The vent port 127 may comprise a filter to allow air to enter the interior of the container 114 from the exterior of the container 114 (e.g., via the internal chamber 122), while preventing the composition 115 from exiting through the vent port 127. The filter preferably comprises a bacterial filter configured to prevent contaminants such as bacteria from entering the interior of the container 114. The filter can thus prevent contaminants from entering the enteral feeding line 112. However, some embodiments of the adapter 100 do not include a vent, and in such embodiments, preferably the only access to the container 114 is through the passage formed by the internal chamber 122 and the fluid exit port 121.

A non-limiting example of a method of using the adapter 100 is generally illustrated in FIGS. 5-12. The container 114 can comprise a hole 140; for example, the hole 140 can be cut in the body of the container 114 before application of the cover 120 to the container 114. Additionally or alternatively, the container 114 can comprise a portion having a reduced thickness relative to the surrounding portions of the container 114 and/or defined by perforations in the container 114, and the spike 116 can form the hole 140 by positioning the adapter 100 (e.g., the stop surfaces 183) in abutment with the container 114.

The hole 140 may be of any suitable shape, e.g. circular or rectangle, and any suitable dimension, e.g., may have a diameter of about 0.3 cm to about 3.0 cm, preferably about 0.6 cm to about 2 cm, more preferably about 1.2 cm to about 1.5 cm, most preferably about 1.3 cm to about 1.4 cm, for example about 0.6 cm. The cover 120 can be removed prior to connecting the adapter 100, but preferably the spike 116 opens the cover 120 to connect the adapter 100 to the container 114, for example by piercing and/or tearing the cover 120 (e.g., to expose the interior of the container 114 to the internal chamber 122 of the adapter 100).

Figure 6A:
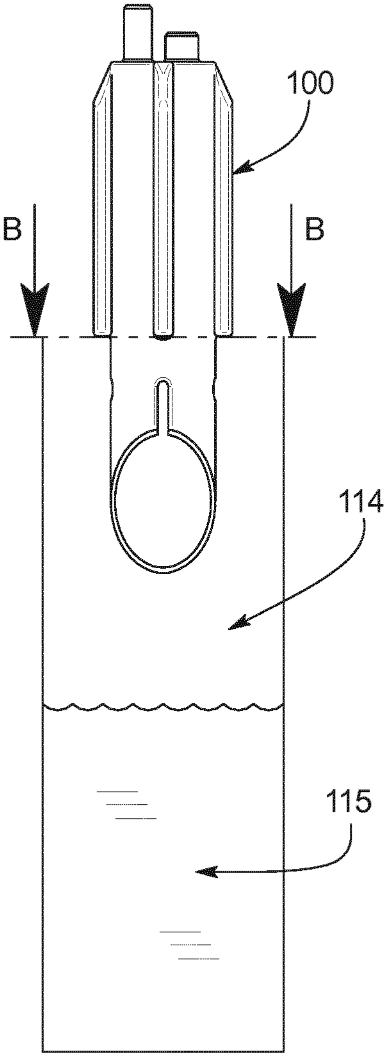
FIG. 6A is a side plan view of the first embodiment of the adapter attached to a container.
Figure 6B:
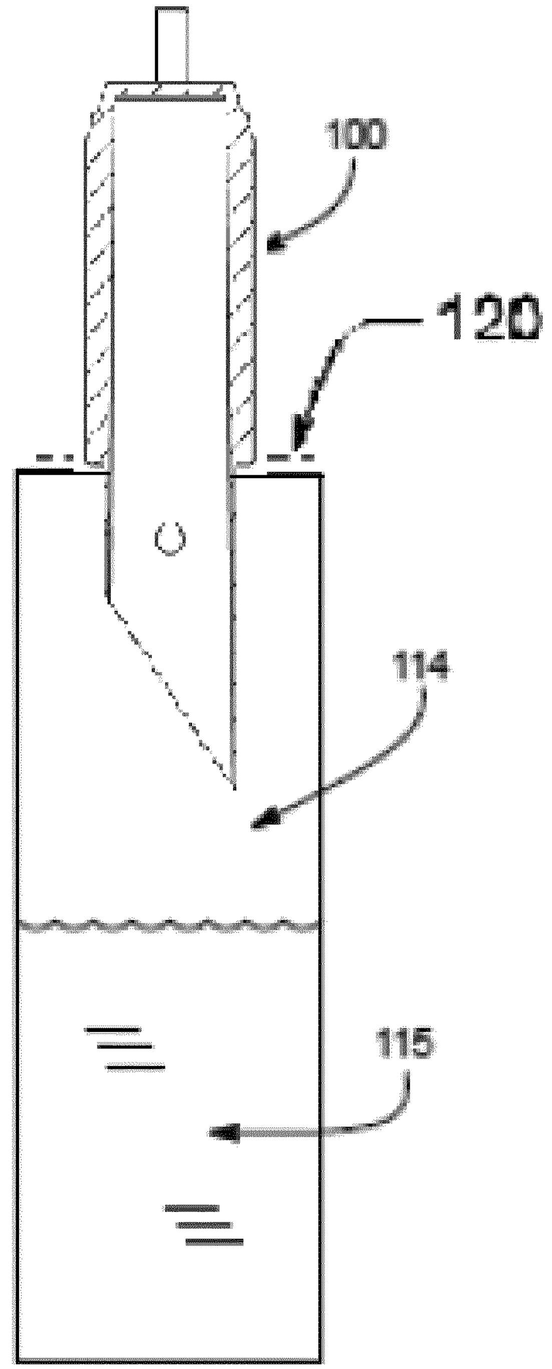
FIG. 6B is a side cross-section view of the first embodiment of the adapter attached to a container.
Figure 7:
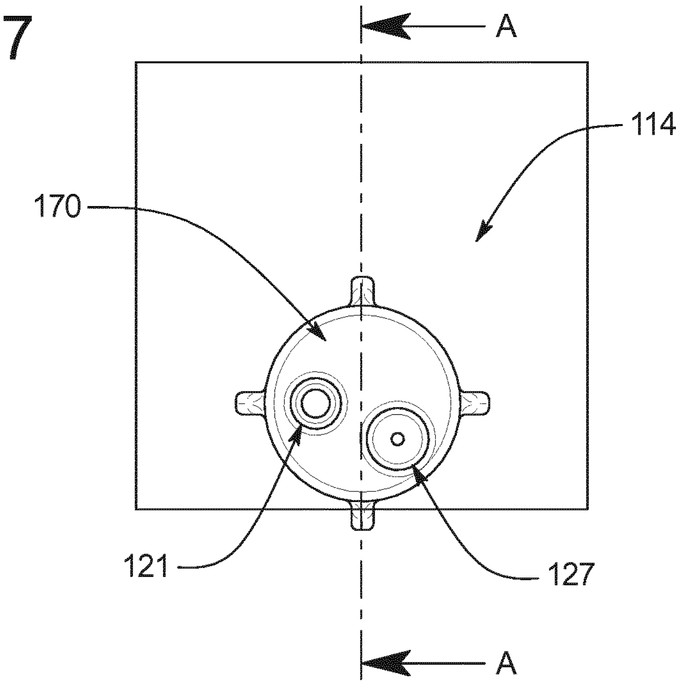
FIG. 7 is an above plan view of the first embodiment of the adapter attached to a container.

The adapter 100 can be pushed into and/or twisted into the container 114 such that the spike 116 opens the cover 120, for example by piercing and/or tearing the cover 120, and inserts into the hole 140. Insertion of the spike 116 into the interior of the container 114 can expose the opening in the bottom end 117 of the body 118 to the interior of the container 114 so that the composition 115 can enter the internal chamber 122 (FIGS. 6A, 6B and 8).

As shown in FIG. 9, the spike 116 preferably has a profile larger than the hole 140 in the container 114 into which the spike 116 is inserted (i.e., larger in at least one dimension). Thus the spike 116 can enlarge the hole 140 and preferably also forms a fluid-tight seal on the hole 140.

Figure 10:
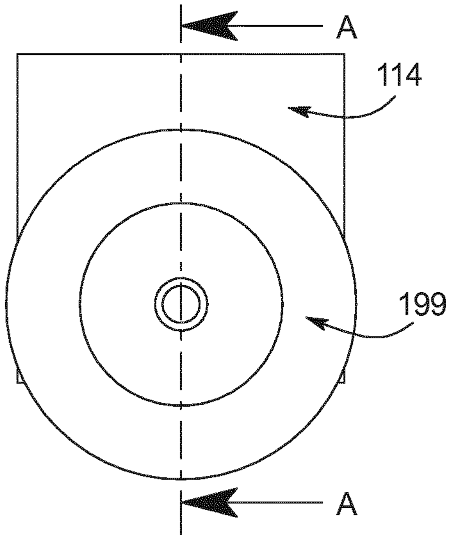
FIG. 10 is an above plan view of an assembly of a syringe with the first embodiment of the adapter attached to a container.
Figure 11:
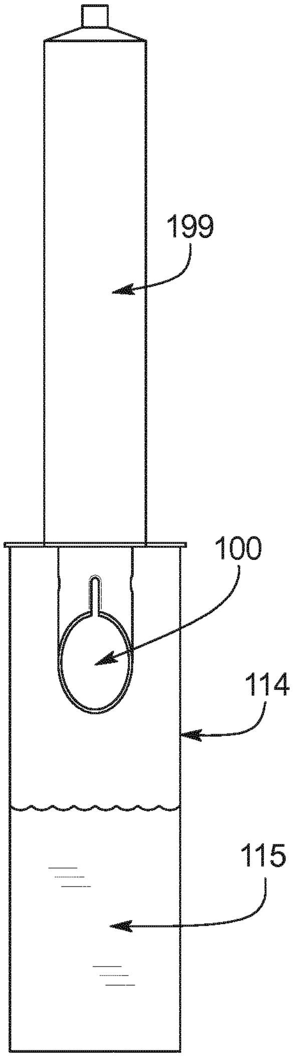
FIG. 11 is a side plan view of the assembly of the syringe and the first embodiment of the adapter attached to a container.
Figure 12:
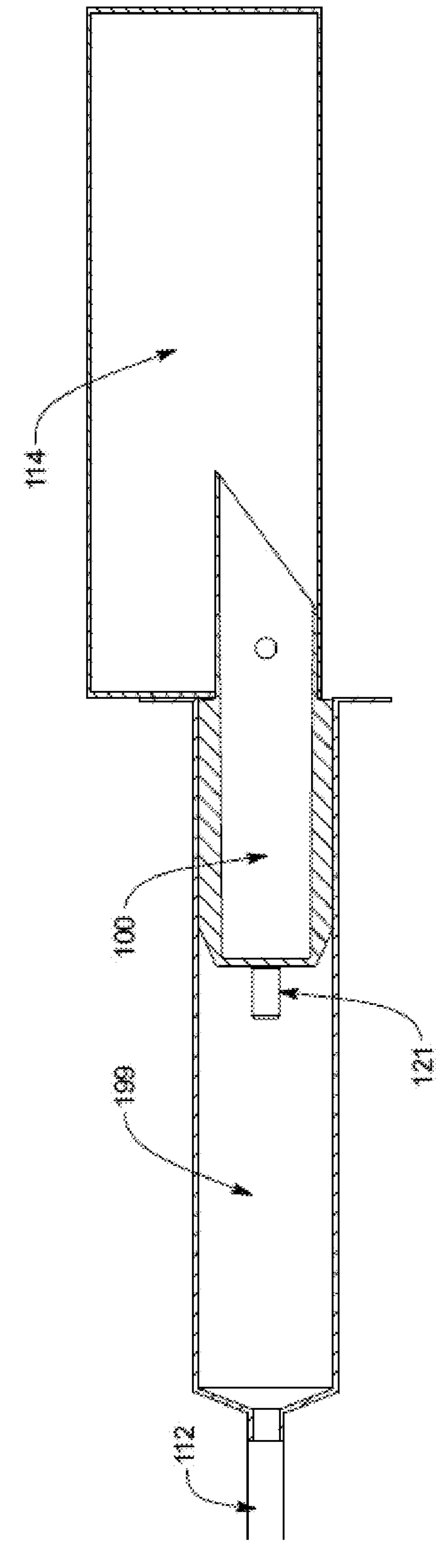
FIG. 12 is a side cross-section view of the assembly of the syringe and the first embodiment of the adapter attached to a container.
Figure 13:
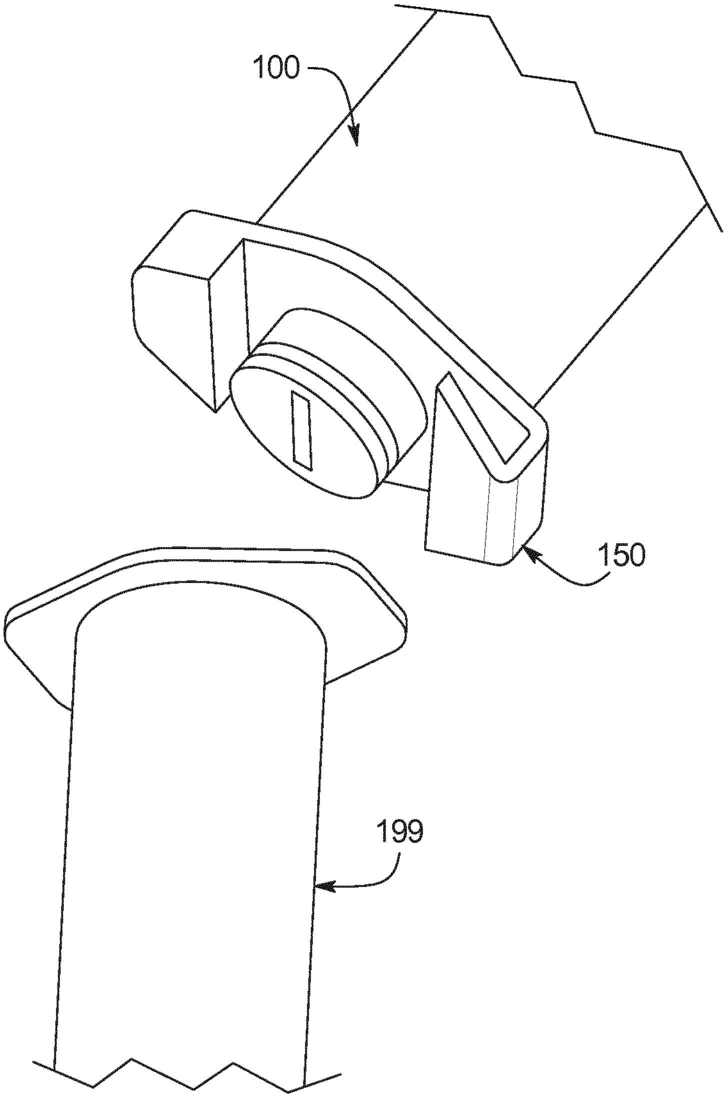
FIG. 13 is side perspective view of a version of the first embodiment of the adapter for attachment to the syringe.
Figure 14:
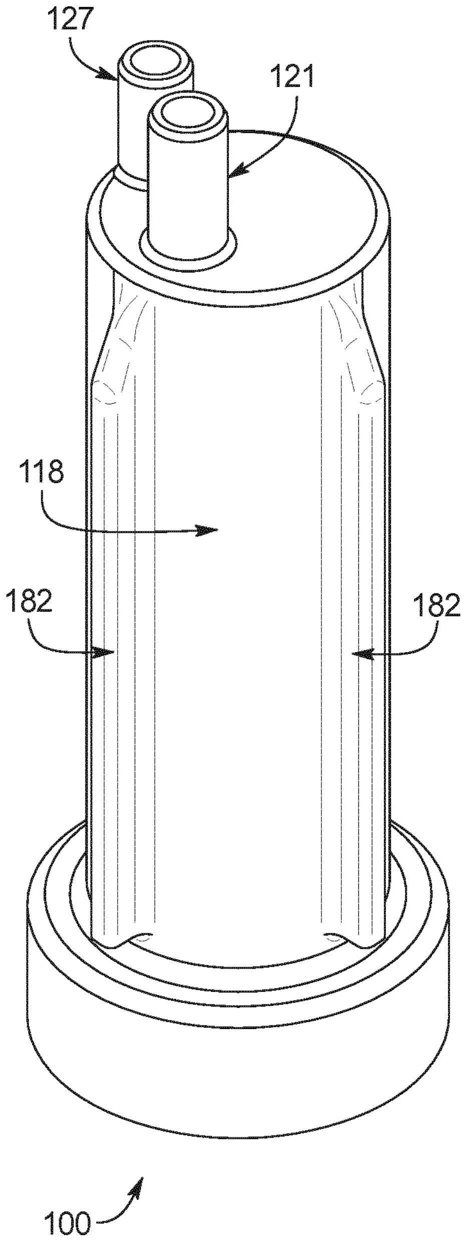
FIGS. 14-19 generally illustrate a version of the first embodiment of the adapter, in which the adapter includes one or more threads for reversible connection to a threaded port of a container.
Figure 15:
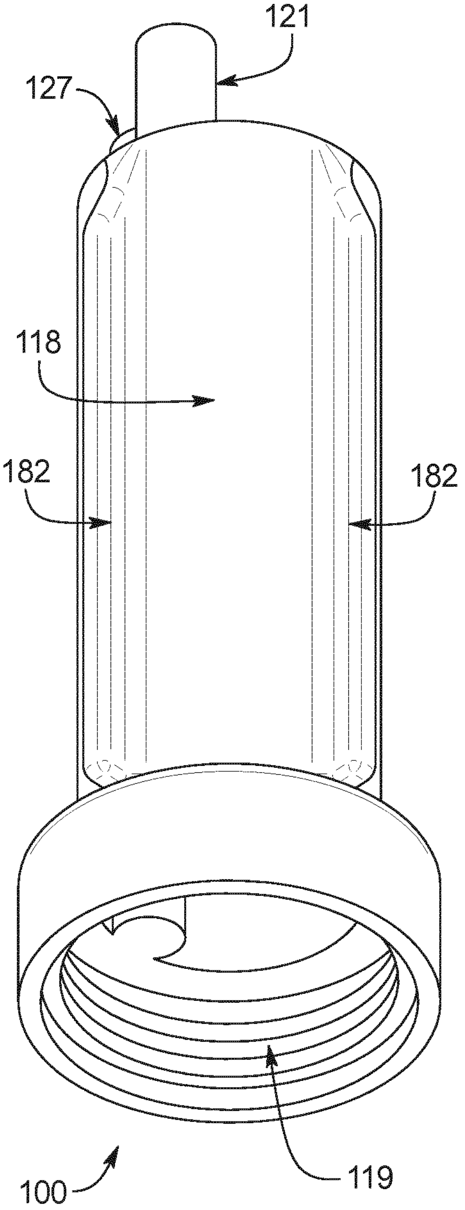
Figure 16:
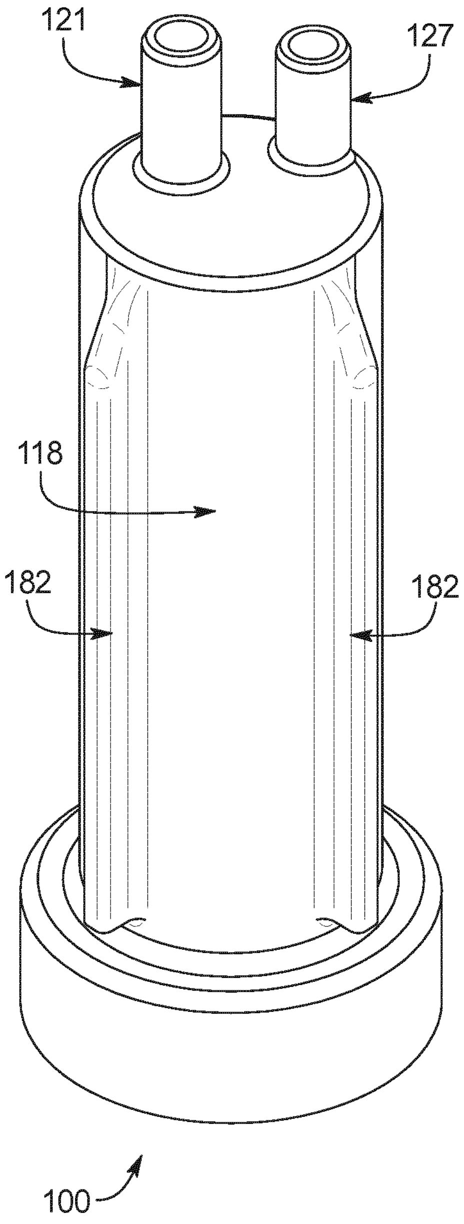
Figure 17:
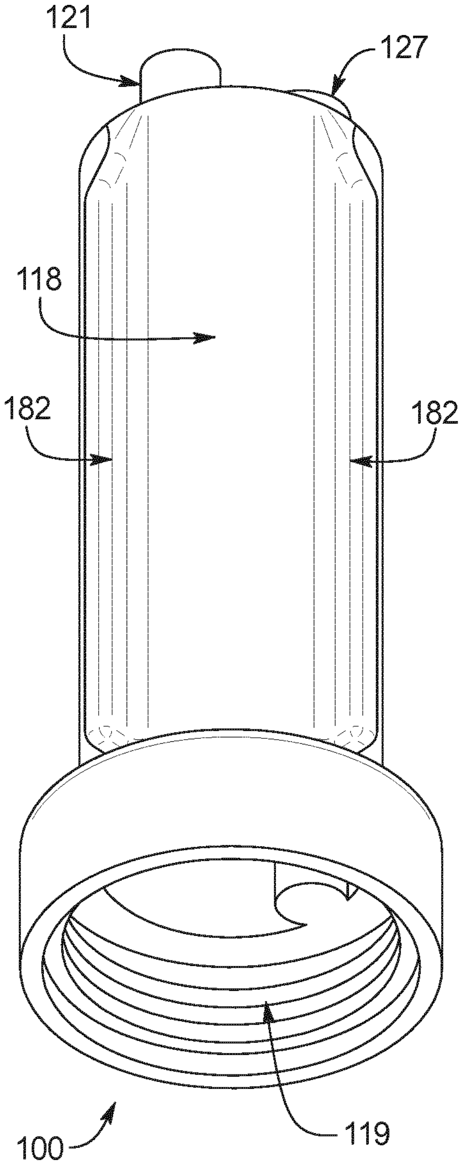
Figure 18:
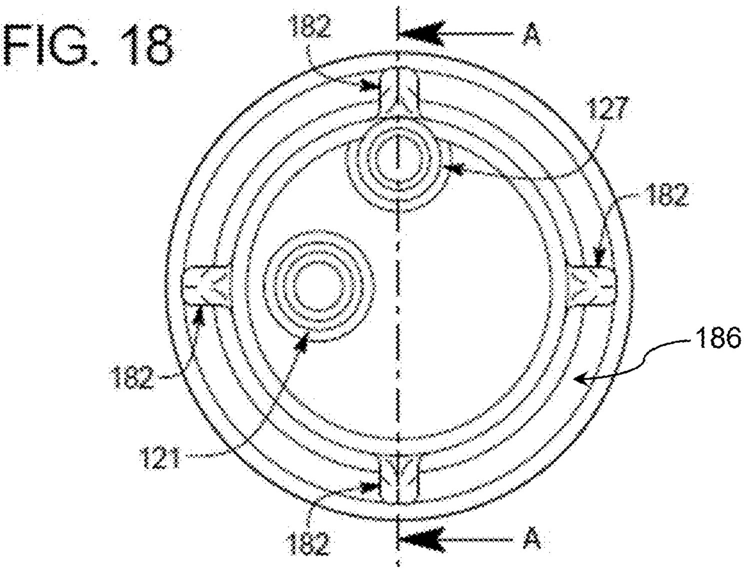
Figure 19:
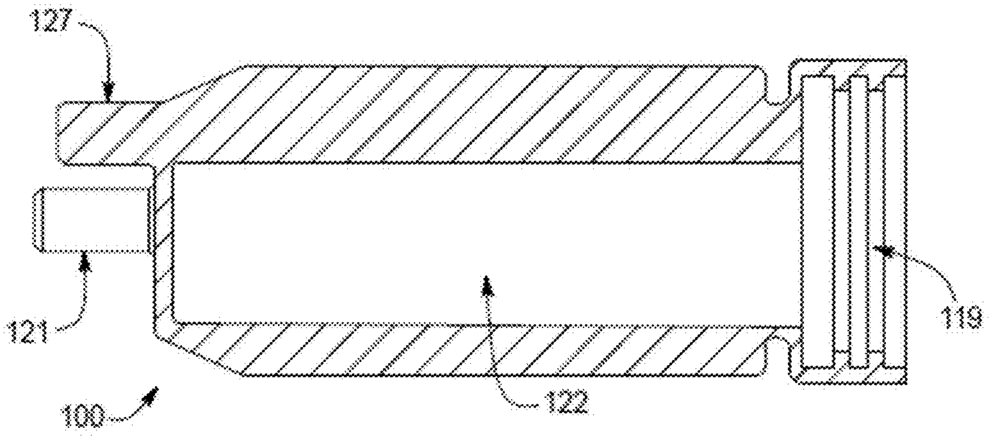
Figure 23:
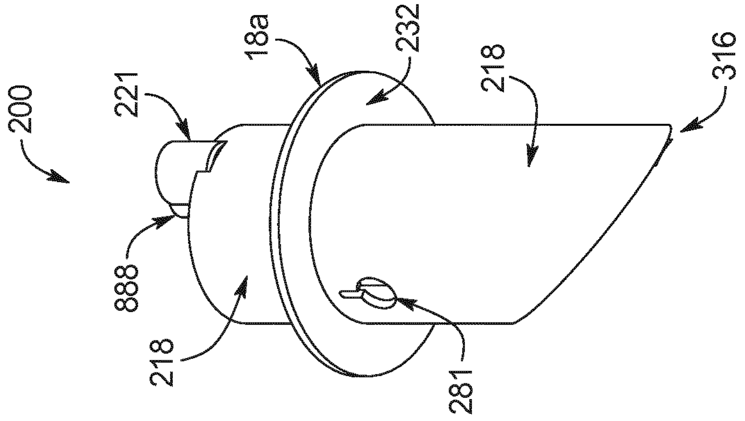
FIGS. 20-28 generally illustrate a first version of a second embodiment of the adapter.
Figure 22:
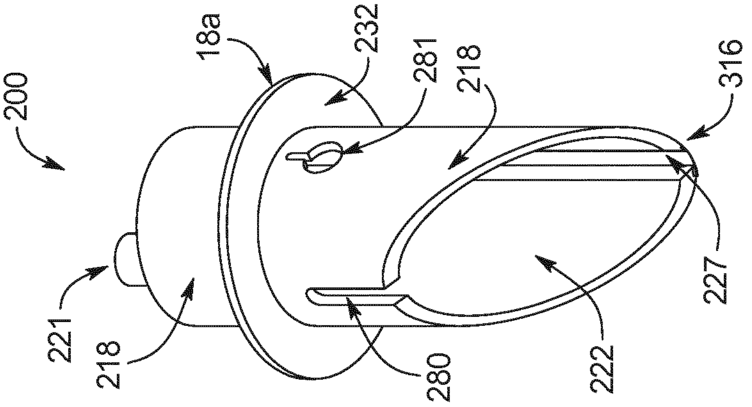
Figure 21:
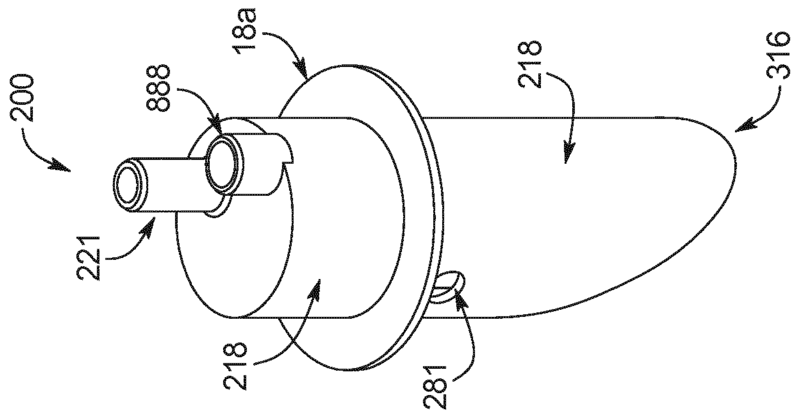
Figure 20:
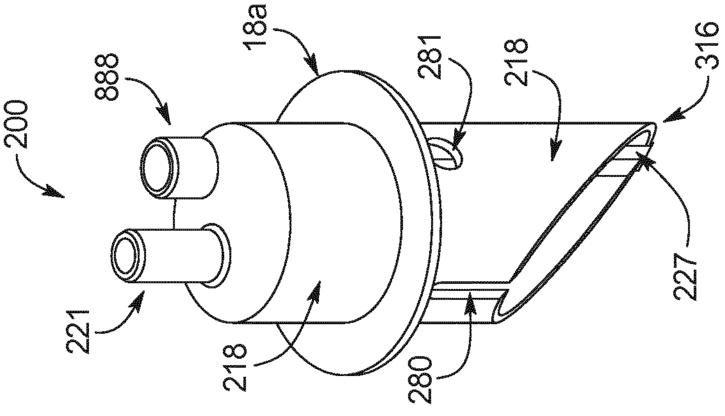
Figure 24:
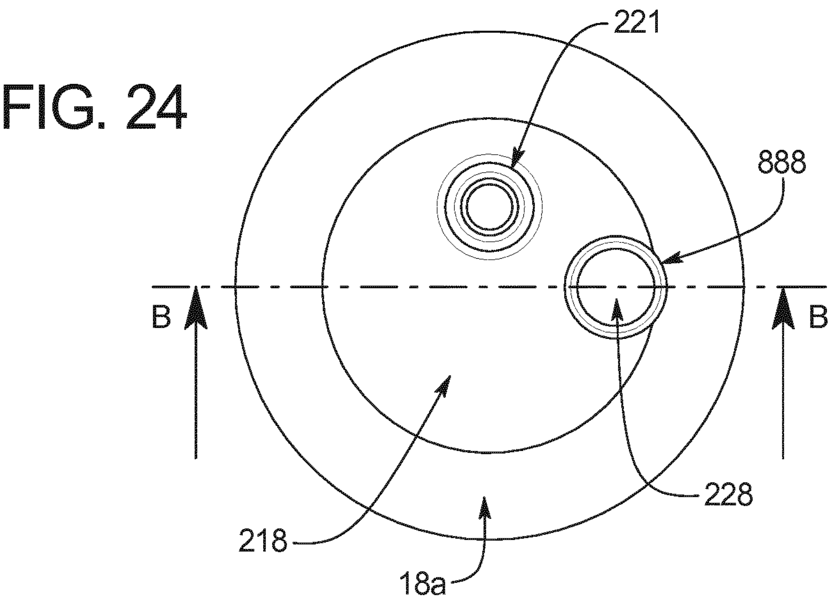
Figure 25:
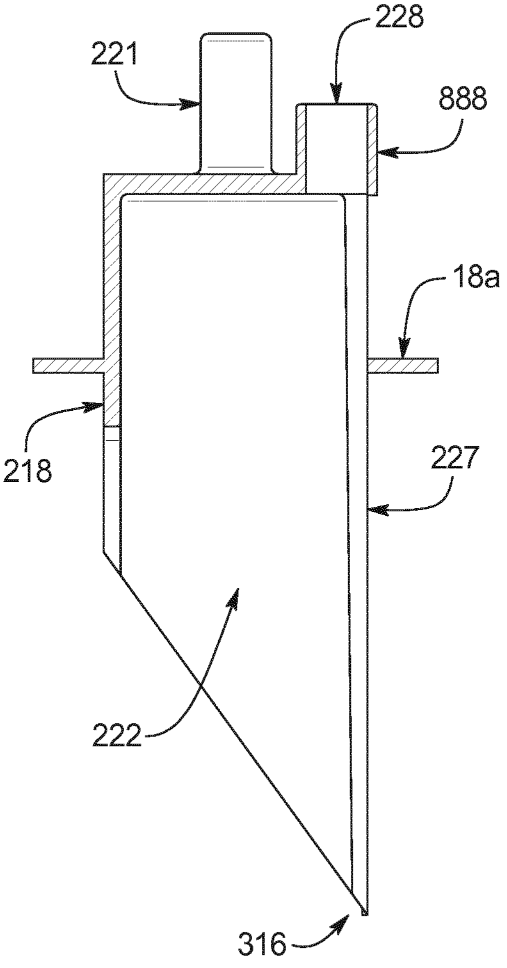
Figure 26:
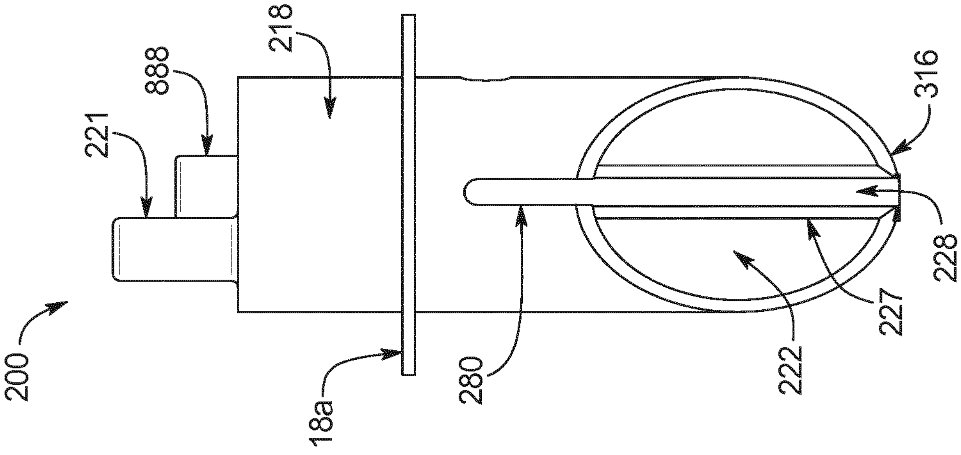
Figure 27:
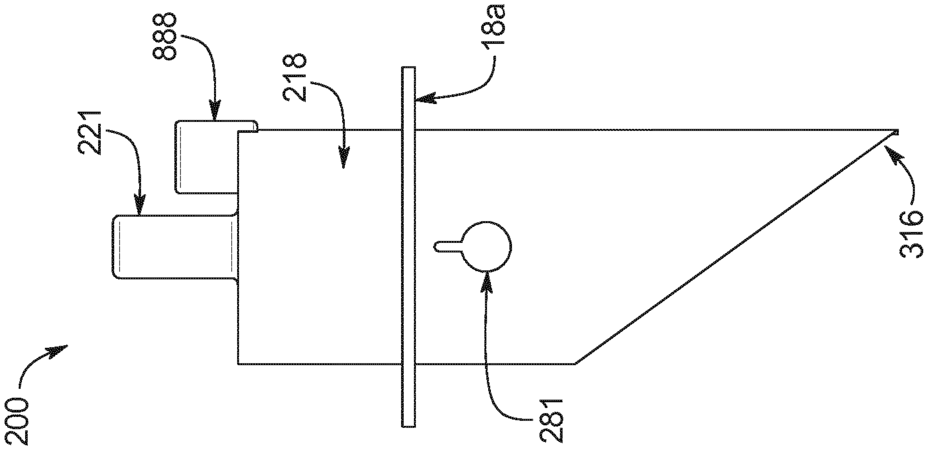
Figure 28:
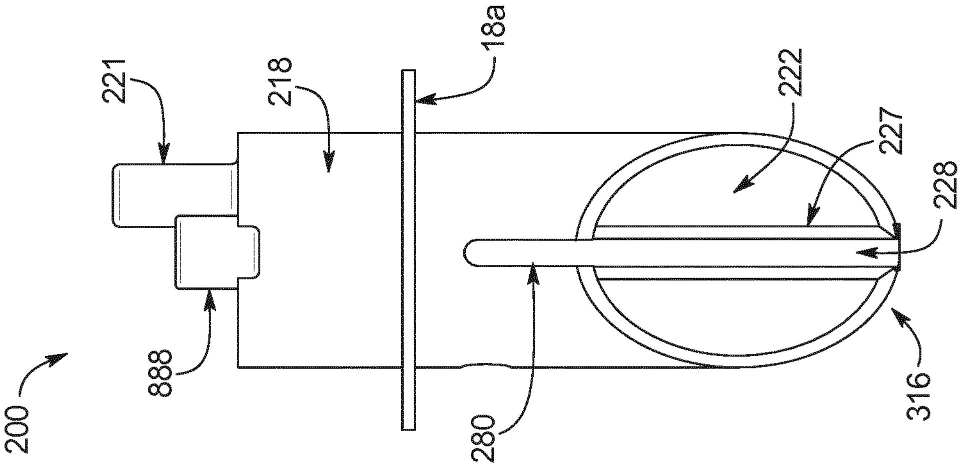
Figure 29:
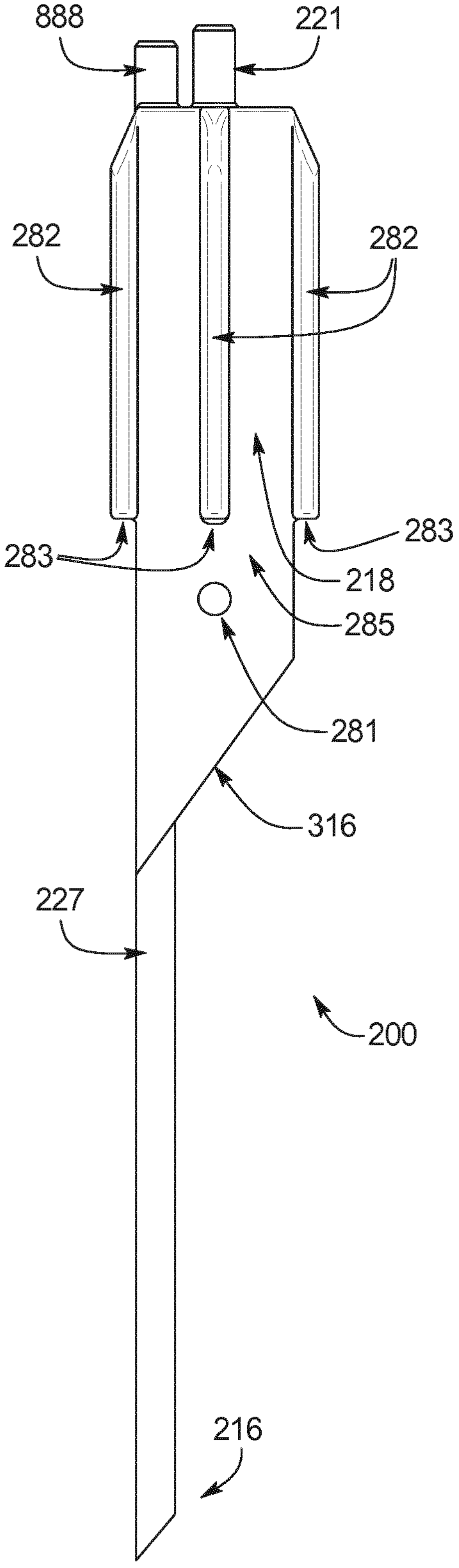
FIG. 29 is a side plan view of a second version of the second embodiment of an adapter provided by the present disclosure.
Figure 30:
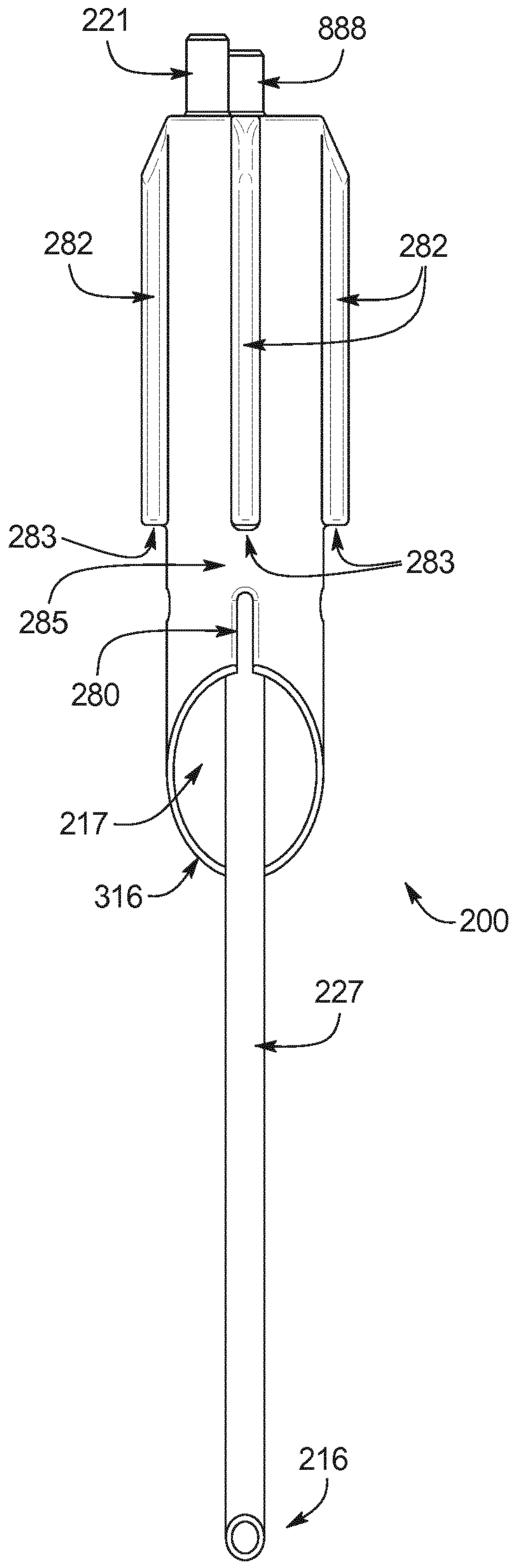
FIG. 30 is a side plan view of the second version of the second embodiment of an adapter.
Figure 31:
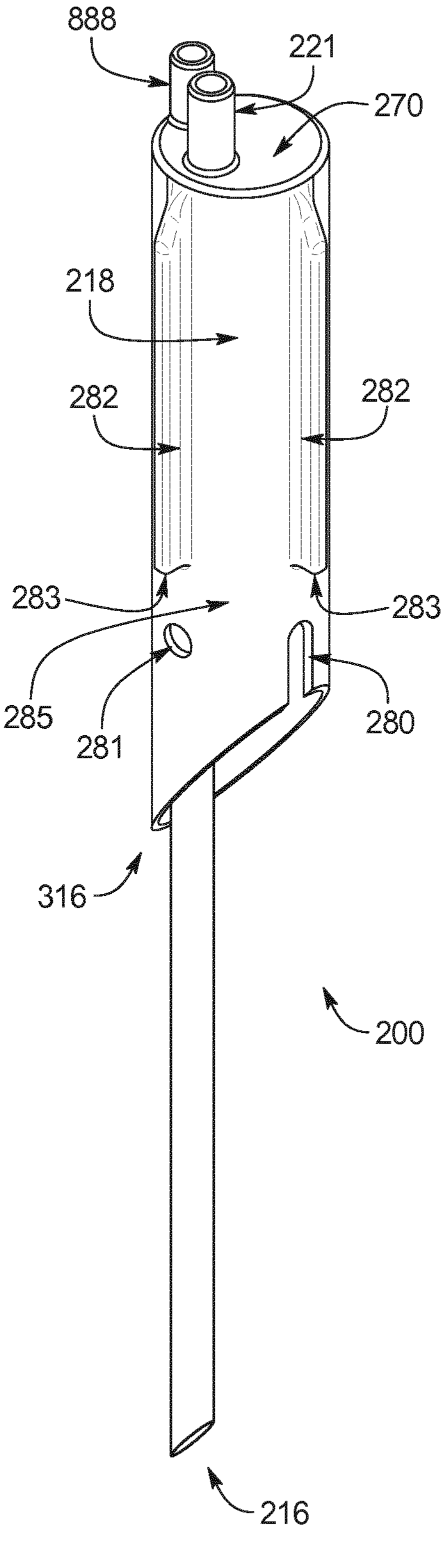
FIG. 31 is a side perspective view of the second version of the second embodiment of the adapter.
Figure 32:
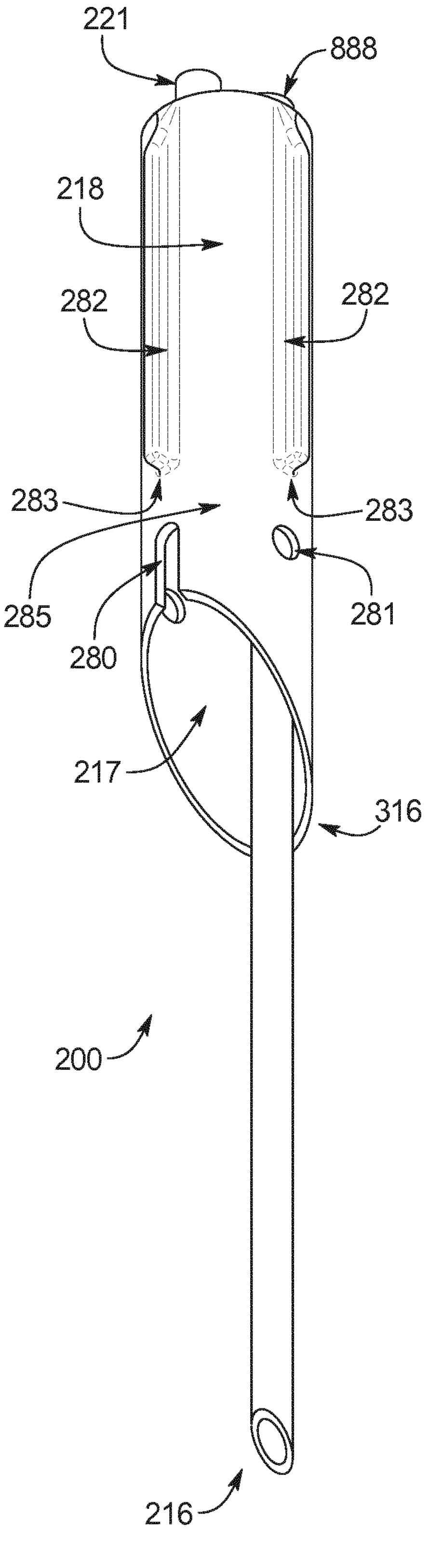
FIG. 32 is a side perspective view of the second version of the second embodiment of the adapter.
Figure 33:
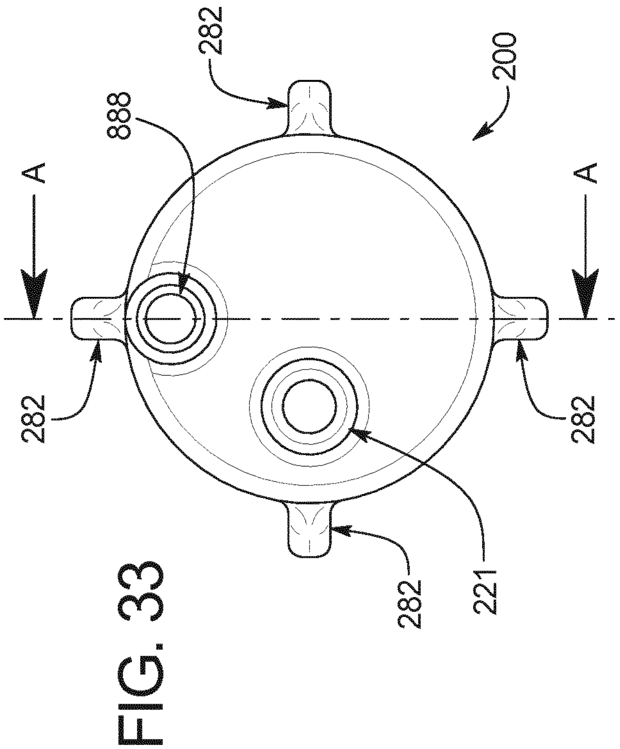
FIG. 33 is an above plan view of the second version of the second embodiment of the adapter and identifies the cross-section used in FIG. 34.
Figure 34:
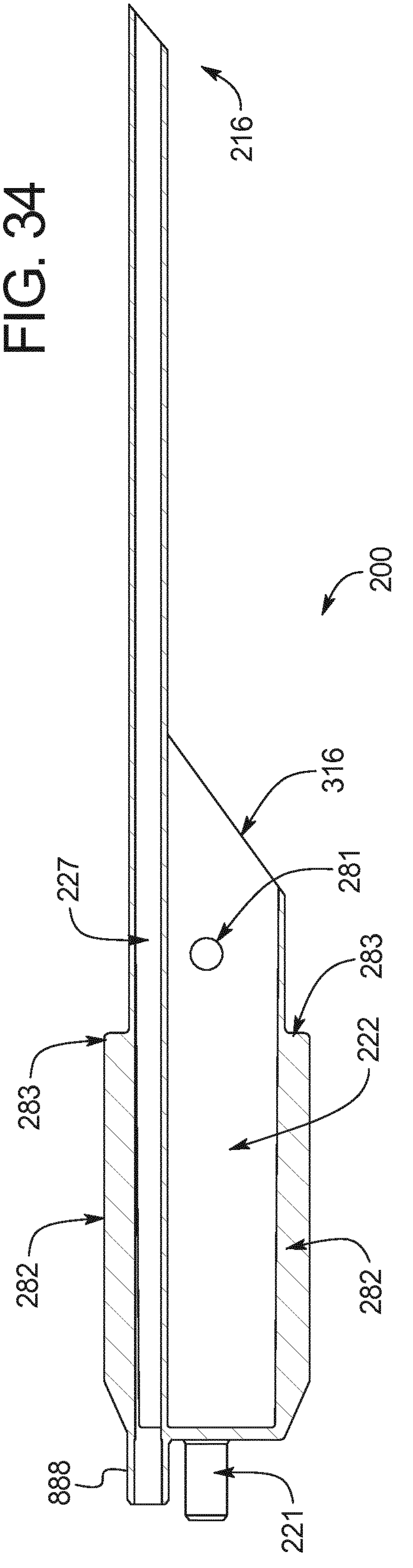
FIG. 34 is a side cross-section view of the second version of the second embodiment of the adapter.

The container 114 can be inverted by a user. As shown in FIGS. 10-12, the adapter 100 can be inserted into the syringe 199 to thereby place the interior of the container 114 in fluid communication with the enteral feeding line 112 via the adapter 100 (e.g., via the opening in the bottom end 117 of the body 118, the internal chamber 122, and the fluid exit port 121) and the syringe 199. As shown in FIG. 13, the adapter 100 can comprise a clip 150 that reversibly attaches to the syringe 199.

The composition 115 can be directed through the adapter 100 into the syringe 199 and then the enteral feeding line 112 by gravity and/or by applying pressure to the container 114, for example by squeezing the container 114 (e.g., without the use of a pump). The composition 115 can travel into the patient through the enteral feeding line 112.

Preferably one or more parts of the adapter 100 (e.g., the body 118) and/or the syringe 199 can be transparent to allow a user to observe the flow of the composition 115 into the adapter 100 and then into the syringe 199 before entering the enteral feeding line 112.

In some embodiments, feeding can be paused by disconnecting the adapter 100 from the container 114 or the syringe 199, capping the container 114 or capping the adapter port 121, and storing the container 114 (e.g., refrigerating the container 114). Then feeding can be resumed at a later time by reconnecting the adapter 100 to the container 114 or to the syringe 199. Preferably the adapter 100 is reusable, i.e., another container can be used for enteral administration using the same adapter 100 after cleaning of the adapter 100. Further in this regard, the friction seal achieved by the adapter 100 can allow it to be reusable with minimal, if any, loss of connectivity for a container such as a laminated paper container.

FIGS. 14-19 generally illustrate a version of the first embodiment in which the adapter 100 has threads 119 in the body 118 that can reversibly connect to corresponding threads on the container 114.

The first embodiment (e.g., the adapter 100) can be used with minimal exertion of motor skills, can provide visualization of flow, can provide reliable flow, and can decrease spillage relative to known enteral administration methods, as a result of the features disclosed herein. Furthermore, the adapter 100 can allow feeding to be delayed and finished later without irreversible membrane clogging. Moreover, the adapter 100 can form a friction fit with the container 114 and can use an interface with the syringe 199 that provides stability and allows single-handed use.

A second embodiment provided by the present disclosure is generally illustrated in FIGS. 20-48, although as noted earlier herein, any embodiment disclosed herein can be combined with any other embodiment disclosed herein unless explicitly stated otherwise. In the second embodiment, an adapter 200 may connect an enteral feeding line 212 to a container 214, preferably a laminated paper container. The container 214 can be initially sealed by a cover 220, such as aluminum foil. To allow administration of a composition 215 initially positioned in the interior of the container 214, e.g., a fluid such as an enteral composition, the cover 220 can be opened by the adapter 200 to establish a passageway from the interior of the container 214 through the adapter 200 into the enteral feeding line 212.

Therefore, a first version of the adapter 200 (FIGS. 20-28) can comprise a short spike 316 for forming an opening in the container 214, such as a flap in the cover 220. A second version of the adapter 200 (FIGS. 29-48) can comprise the short spike 316 and further comprise a long spike 216 for cooperatively forming an opening in the container 214, such as a flap in the cover 220.

The cover 220 can comprise a pull-tab which can be removed from the remainder of the container 214 prior to connecting the adapter 200 to the container 214; for example, the cover 220 can be peeled off one or more surfaces of the container 214. However, the first version of the adapter 200 (FIGS. 20-28) preferably opens the cover 220 by using the short spike 316 to pierce and/or tear the cover 220, and then the short spike 316 is pushed through the first opening to expand the first opening to form a second opening in the cover 220 larger than the first opening.

In the first version of the adapter 200 (FIGS. 20-28), the short spike 316 can protrude from one or more plates 18 of the first version of the adapter 200, preferably one or more horizontal plates, e.g., a first plate 18*a*. Each of the one or more plates 18 preferably has a generally rectangular shape or a generally circular shape, but each the one or more plates 18 can be any shape, and the present disclosure is not limited to a specific shape of the one or more plates 18.

Positioning the first version of the adapter 200 (e.g., the bottom-most plate of the one or more plates 18) to abut the container 214 can force the short spike 316 into and at least partially through the cover 220. The short spike 316 can thus form an opening in the cover 220 to thereby establish a passageway for the composition 215 from the interior of the container 214 through the first version of the adapter 200 into the enteral feeding line 12. In this regard, the first version of the adapter 200 can comprise a fluid inlet on the same side of the one or more plates 18 as the short spike 316. The first version of the adapter 200 can comprise a fluid exit port 221 on the opposite side of the one or more plates 18; and the adapter 200 can comprise a bore extending through the one or more plates 18 to fluidly connect the fluid inlet to the fluid exit port 221. The dimension of the bore may be adapted to the type and to the viscosity of the composition 215 (e.g., a fluid) contained in the container 214 to be delivered.

The enteral feeding line 212 can fluidly connect to the fluid exit port 221 of the adapter 200. For example, the diameter of the entry end of the enteral feeding line 212 can be substantially the same as the diameter of the fluid exit port 221 and can circumscribe the fluid exit port 221 with a fluid-tight seal.

The first version of the adapter 200 (FIGS. 20-28) can comprise a vent port 888 (e.g., connected to a vent tube 227) configured to allow air to enter the interior of the container 214 to compensate for the composition 215 exiting the container 214 through the adapter 200. The vent port 888 and/or the vent tube 227 can comprise a vent passage 228 extending from (i) the same side of the one or more plates 18 as the short spike 316 to (ii) the opposite side of the one or more plates 18 to allow air to enter the interior of the container 214 from the exterior of the container 214.

The vent port 888 and/or the vent tube 227 may comprise a filter positioned therein (i.e., within the vent passage 228) to allow air to enter the interior of the container 214 through the vent passage 228 from the exterior of the container 214, while preventing the composition 215 from exiting through the vent passage 228. The filter preferably comprises a bacterial filter configured to prevent contaminants such as bacteria from entering the interior of the container 214. The filter can thus prevent contaminants from entering the enteral feeding line 212.

In an embodiment of the first version of the adapter 200 (FIGS. 20-28), the adapter 200 comprises an adhesive pad 232 configured to form a fluid-tight seal with the top surface and/or one or more side surfaces of the container 214 upon engagement of the adapter 200 with the container 214. The adhesive pad 232 can be connected to the one or more plates 18, and at least a portion of the adhesive pad 232 can be parallel to and/or co-planar with at least a portion of the one or more plates 18. Preferably the adapter 200 is provided with a protective film covering the adhesive pad 232, and the protective film can be removed before using the adapter 200.

Accordingly, the first version of the adapter 200 (FIGS. 20-28) can be used in a method of providing enteral nutrition from the container 214, the container 214 comprising a pre-formed hole into an interior of the container, the method comprising: connecting the first version of the adapter 200 to the container 214, the connecting of the first version of the adapter 200 to the container 214 comprises pressing the short spike 316 of the adapter 200 through the pre-formed hole in the container 214, the short spike 316 is larger in at least one dimension than the pre-formed hole, the pressing of the short spike 316 of the first version of the adapter 200 through the pre-formed hole expands the hole in at least one direction; and inverting the container 214 with the first version of the adapter 200 attached thereto, wherein the inverting of the container 214 directs at least a portion of the composition 215 in the container 214 through the first version of the adapter 200 and then into the enteral feeding line 212 having a first end attached to the first version of the adapter 200, and a second end of the enteral feeding line 212 is positioned in a patient. Preferably the method comprises fluidly connecting the first version of the adapter 200 to the enteral feeding line 212 before and/or after the connecting of the first version of the adapter 200 to the container 214.

For the second version of the adapter 200 (FIGS. 29-48), the cover 220 is preferably opened by the long spike 216 to form a first opening in the cover 220, for example by piercing and/or tearing the cover 220, and then subsequently the short spike 316 is pushed through the first opening to expand the first opening to form a second opening in the cover 220 larger than the first opening.

The present disclosure is not limited to a specific embodiment of the long spike 216 and the short spike 316, and the long spike 216 and the short spike 316 can be any structures configured to open the cover 120, for example by piercing and/or tearing the cover 220. Moreover, "short" and "long" do not indicate any specific lengths and instead merely denote relative lengths of the spikes 216,316 with respect to each other.

The second embodiment of the adapter 200 (e.g., the first version and/or the second version) can comprise a body 218 that is preferably at least partially hollow, preferably by comprising an internal chamber 222. The vent tube 227 can extend both outward from the top surface 270 and inward from the top surface 270 through the internal chamber 222.

In the first version of the adapter 200 (FIGS. 20-28), the vent tube 227 preferably extends to a point adjacent to the short spike 316. In the second version of the adapter 200 (FIGS. 29-48), the vent tube 227 preferably extends to a point past the short spike 316. Preferably, a total length of the vent tube 227 in the second version can be about 1.5 to about 3.0 times as long as the body 218 in the longitudinal direction, and/or the vent tube 227 can have a length inside the container 214 that is about 0.5 to about 1.0 times as long as a height of the container 214 (e.g., about 0.5 to about 0.75 times as long as a height of the container 214).

Figure 35A:
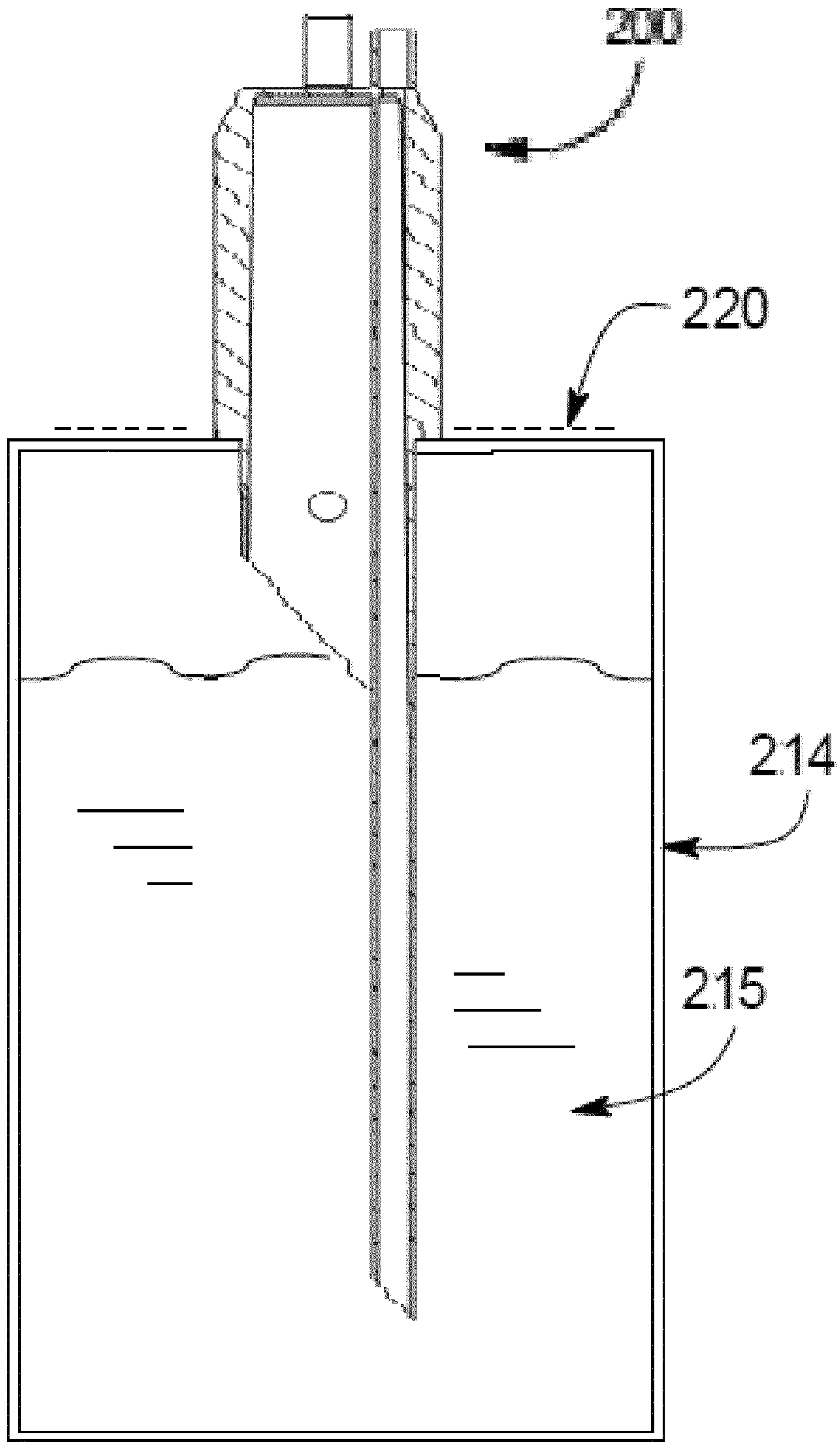
FIG. 35A is a side plan view of the second version of the second embodiment of the adapter attached to a container.
Figure 35B:
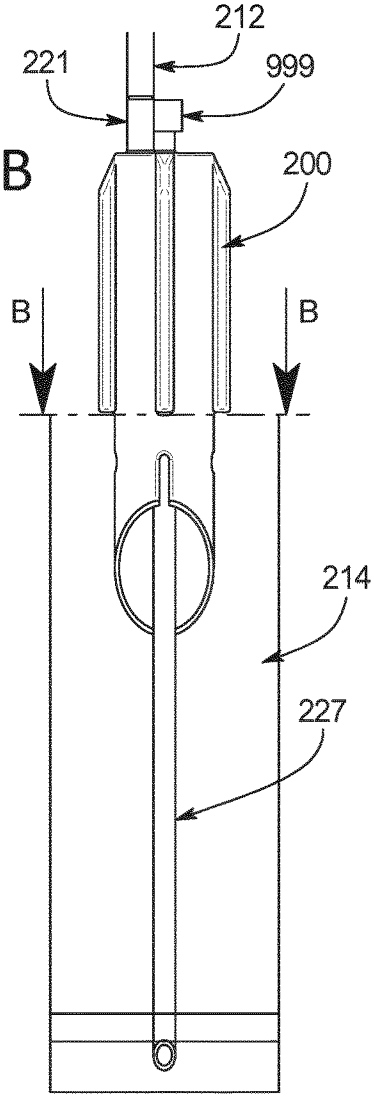
FIG. 35B is a side cross-section view of the second version of the second embodiment of the adapter attached to a container.

Further regarding the second version of the adapter 200 (FIGS. 29-48), the bottom-most end of the vent tube 227 can terminate in the head space of the container 214 when the container 214 is inverted for fluid delivery, as shown in FIG. 35B. The bottom-most end of the vent tube 227 can form the long spike 216.

In the second embodiment of the adapter 200 (e.g., the first version and/or the second version), optionally a top end of the vent tube 227 can comprise an indicator port configured to be connected to a cap and/or a flexible tube to indicate that the vent tube 227 has fluid therein and/or is plugged. In such embodiments, a stylet 999 can be used to plug and/or restrict the vent tube 227. Additionally or alternatively, a clamp and/or a cap can be used to plug and/or restrict the vent tube 227.

In the second version of the adapter 200 (FIGS. 29-48), the vent tube 227 can have a reduced profile to reduce the force to puncture the cover 220 with the long spike 216. The vent tube 227 can have a reduced internal cross section at the long spike 216 to minimize entry of fluid into the vent tube 227.

In some embodiments, the adapter 200 can be modular. For example, the vent tube 227 can be a separate piece from the body 218, and the vent tube 227 can be inserted through the body 218 of the adapter 200 separately from connection of the adapter 200 to the container 214.

In the second embodiment of the adapter 200 (e.g., the first version and/or the second version), the short spike 316 can be a part of the body 218, for example a bottom end 217 of the body 218 that also defines an opening into the internal chamber 122. The short spike 316 preferably has a profile larger than the pre-formed hole 240 in the container 214 into which the short spike 316 is inserted (i.e., larger in at least one dimension). For example, the opening defined by the bottom end 217 of the body 218 can be in a plane that is angled relative to the side walls of the body 218 and/or the longitudinal axis of the body 218. Preferably the body 218 and/or the short spike 316 have a cross-section perpendicular to the longitudinal axis that has a larger circumference (e.g., a larger radius) than that of the hole 240 in the container 214. The body 218 is shown as being generally cylindrical, but the body 218 can be any shape, and the present disclosure is not limited to a specific shape of the body 218.

In the second embodiment of the adapter 200 (e.g., the first version and/or the second version), the opening in the bottom end 217 of the body 218 that forms the short spike 316 preferably lies in a plane at an angle between ten degrees and eighty degrees relative to the side walls of the body 218 and/or the longitudinal axis of the body 218, more preferably at an angle between twenty degrees and seventy degrees relative to the side walls of the body 218 and/or the longitudinal axis of the body 218, most preferably at an angle between thirty degrees and sixty degrees relative to the side walls of the body 218 and/or the longitudinal axis of the body 218.

Similarly in the second version of the adapter 200 (FIGS. 29-48), the opening in the bottom end of the vent tube 227 that forms the long spike 216 preferably lies in a plane at an angle between ten degrees and eighty degrees relative to the side walls of the body 218 and/or the longitudinal axis of the body 218, more preferably at an angle between twenty degrees and seventy degrees relative to the side walls of the body 218 and/or the longitudinal axis of the body 218, most preferably at an angle between thirty degrees and sixty degrees relative to the side walls of the body 218 and/or the longitudinal axis of the body 218.

In the second embodiment of the adapter 200 (e.g., the first version and/or the second version), the vent tube 227 can be configured to allow air to enter the interior of the container 214 to compensate for the composition 215 exiting container 214 through the adapter 200. The vent tube 227 may comprise a filter to allow air to enter the interior of the container 214 from the exterior of the container 214, while preventing the composition 215 from exiting through the vent tube 227. The filter preferably comprises a bacterial filter configured to prevent contaminants such as bacteria from entering the interior of the container 214. The filter can thus prevent contaminants from entering the enteral feeding line 212.

The vent tube 227 can comprise a vent port 888 at the end of the vent tube 227, e.g., opposite from the long spike 216 in the second version. In an embodiment, a section of tubing can be connected to the vent port 888 (e.g., connected to the vent tube 227) and can be transparent to allow visualization of fluid in the vent tube 227, and the tubing can include a cap, valve (e.g., butterfly valve) or roller clamp to adjust the vent and to meter the flow. The stylet 999 can be used to plug the vent passage until feeding is about to begin to thereby prevent fluid from inadvertently entering the vent passage.

In the second embodiment of the adapter 200 (e.g., the first version and/or the second version), the body 218 can optionally comprise a drain slot 280, for example a slot in the body 218 extending upward from the bottom end 217 of the body 218. Additionally or alternatively, the body 218 can optionally comprise a drain hole 281, for example a hole extending through the body 218 adjacent to the bottom end 217 of the body 218.

In the second version of the adapter 200 (FIGS. 29-48), the adapter 200 can further comprise one or more interface surfaces 282 that extend axially from the body 218, for example vertical ribs that extend from the body 218 of the adapter 200 and/or a sleeve circumscribing the body 218 of the adapter 200. The adapter 200 can comprise one or more stop surfaces 283 that can slide into abutment with the top surface of the container 214 as the adapter 200 is continuously pushed into the container 214. The one or more stop surfaces 283 can be part of the interface surfaces 282 (if any) or can be distinct structures. The stop surfaces 283 can prevent further pushing of the adapter 200 into the container 214.

For example, an embodiment of the one or more interface surfaces 282 that comprises vertical ribs can comprise the stop surface 283 at the lower-most end of the rib. As another example, an embodiment of the one or more interface surfaces 282 that comprises a sleeve can comprise the stop surface 283 at the lower-most end of the sleeve. As yet another example, the stop surface 283 can be an annular rim extending from the body 218.

A portion of the body 218 between the stop surfaces 283 and the opening in the bottom end 217 can form a fluid-tight seal and friction retention area 285 that engages the side of the hole in the container 214. In an embodiment, the fluid-tight seal and friction retention area 285 can optionally include a mechanical securing member selected from the group consisting of one or more barbs, one or more bumps, one or more fish gill structures, a rubber material, and combinations thereof. In an embodiment, a retention member can be applied to the top surface 270 of the adapter 200 to assist in securing the adapter 200 to the container 214, for example an elastic band extending from the top surface 270 of the adapter 200 to the bottom of the container 214.

Positioning the adapter 200 such that the one or more stop surfaces 283 abut the container 214 can force the first and second spikes 216,316 into and at least partially through the cover 220. The first and second spikes 216,316 can thus form an opening in the cover 220 and/or the container 214 to thereby establish a passageway for the enteral composition 215 from the interior of the container 214 through the adapter 200 into the enteral feeding line 212. In this regard, the body 218 can comprise a fluid exit port 221 on the top surface 270 of the adapter 200; and the opening defined by the bottom end 217 of the body 218 can lead through the interior of the body 218 (e.g., through the internal chamber 222) to the fluid exit port 221 (particularly shown in FIG. 37). The internal chamber 222 can optionally have a volume which increases the air gap when inverted, thus minimizing the required length of the vent tube 227.

The fluid exit port 221 of the adapter 200 can be fluidly connected to the enteral feeding line 212. For example, the diameter of the entry end of the enteral feeding line 212 can be substantially the same as the diameter of the fluid exit port 221 and can circumscribe the fluid exit port 221 with a fluid-tight seal.

A non-limiting example of a method of using the second version of the adapter 200 is generally illustrated in FIGS. 35A-37. The container 214 can comprise a hole 240; for example, the hole 240 can be cut in the body of the container 214 before application of the cover 120 to the container 214. Additionally or alternatively, the container 214 can comprise a portion having a reduced thickness relative to the surrounding portions of the container 214 and/or defined by perforations in the container 214, and the first and second spikes 216,316 can form the hole 240 by positioning the adapter 214 (e.g., the one or more stop surfaces 183) in abutment with the container 214.

The hole 240 may be of any suitable shape, e.g. circular or rectangle, and any suitable dimension, e.g., may have a diameter of about 0.3 cm to about 3.0 cm, preferably about 0.6 cm to about 2 cm, more preferably about 1.2 cm to about 1.5 cm, most preferably about 1.3 cm to about 1.4 cm, for example about 0.6 cm. The cover 220 can be removed prior to connecting the adapter 200, but preferably the long spike 216 opens the cover 220, for example by piercing and/or tearing the cover 220, and then the short spike 316 further opens the cover 220 to connect the adapter 200 to the container 214 (e.g., to expose the interior of the container 214 to the internal chamber 222 of the adapter 200).

Figure 36:
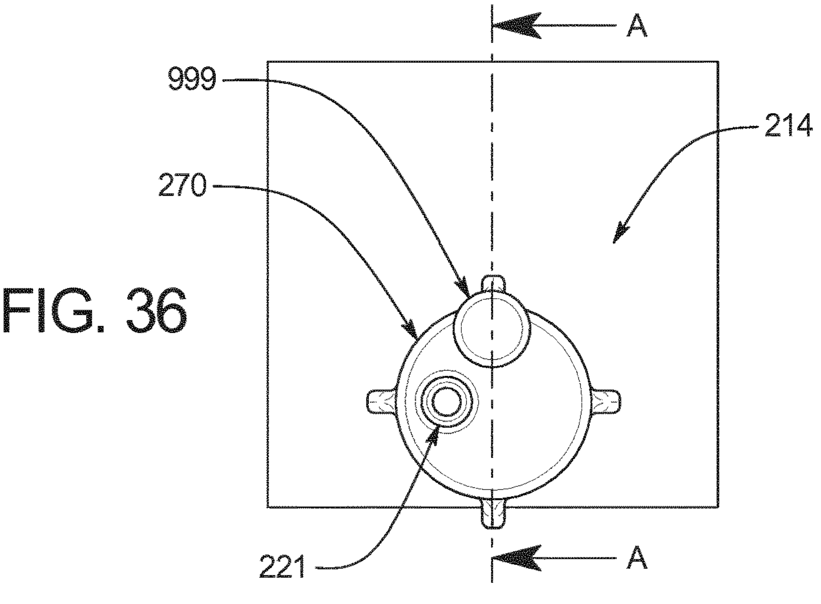
FIG. 36 is an above plan view of the second version of the second embodiment of the adapter attached to a container.
Figure 37:
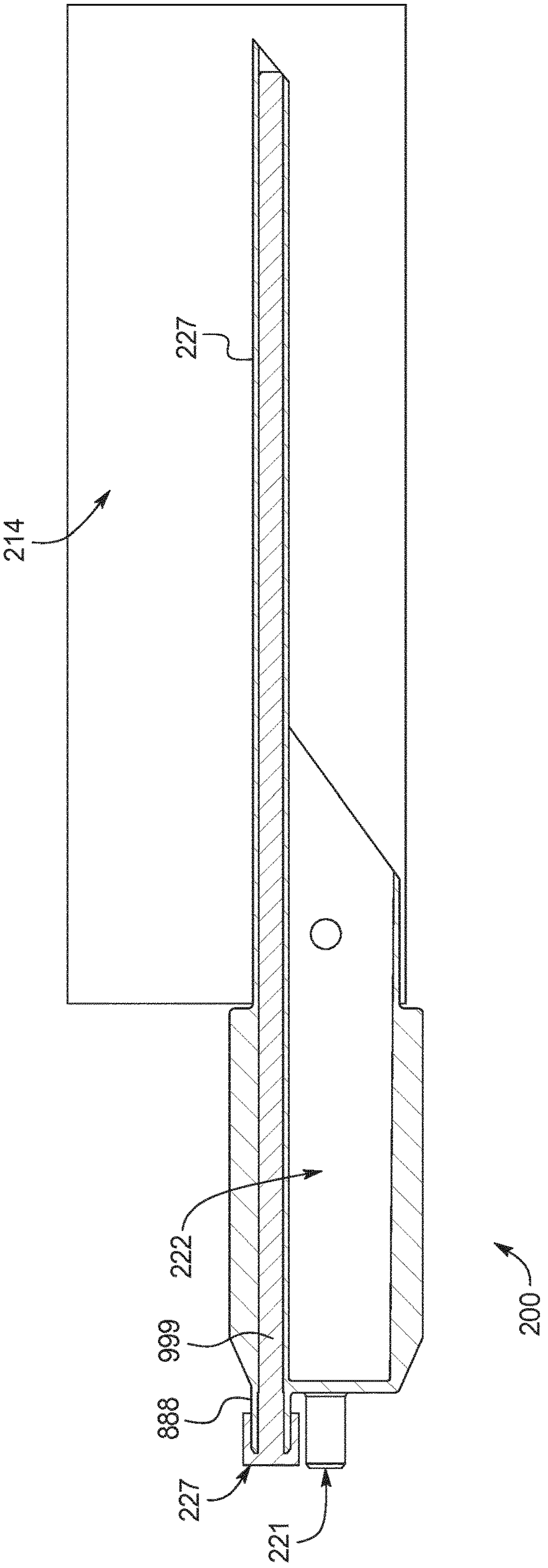
FIG. 37 is a side cross-section view of the second version of the second embodiment of the adapter attached to a container.

The adapter 200 can be pushed into and/or twisted into the container 214 such that the long spike 216 opens the cover 220, for example by piercing and/or tearing the cover 220, and inserts into the hole 240 and then the short spike 316 tears the cover 220 and inserts into the hole 240. Insertion of the first and second spikes 216, 316 into the interior of the container 214 can expose the opening in the bottom end 217 of the body 218 to the interior of the container 214 so that the composition 215 can enter the internal chamber 222 (FIGS. 35A, 35B and 36).

Figure 38:
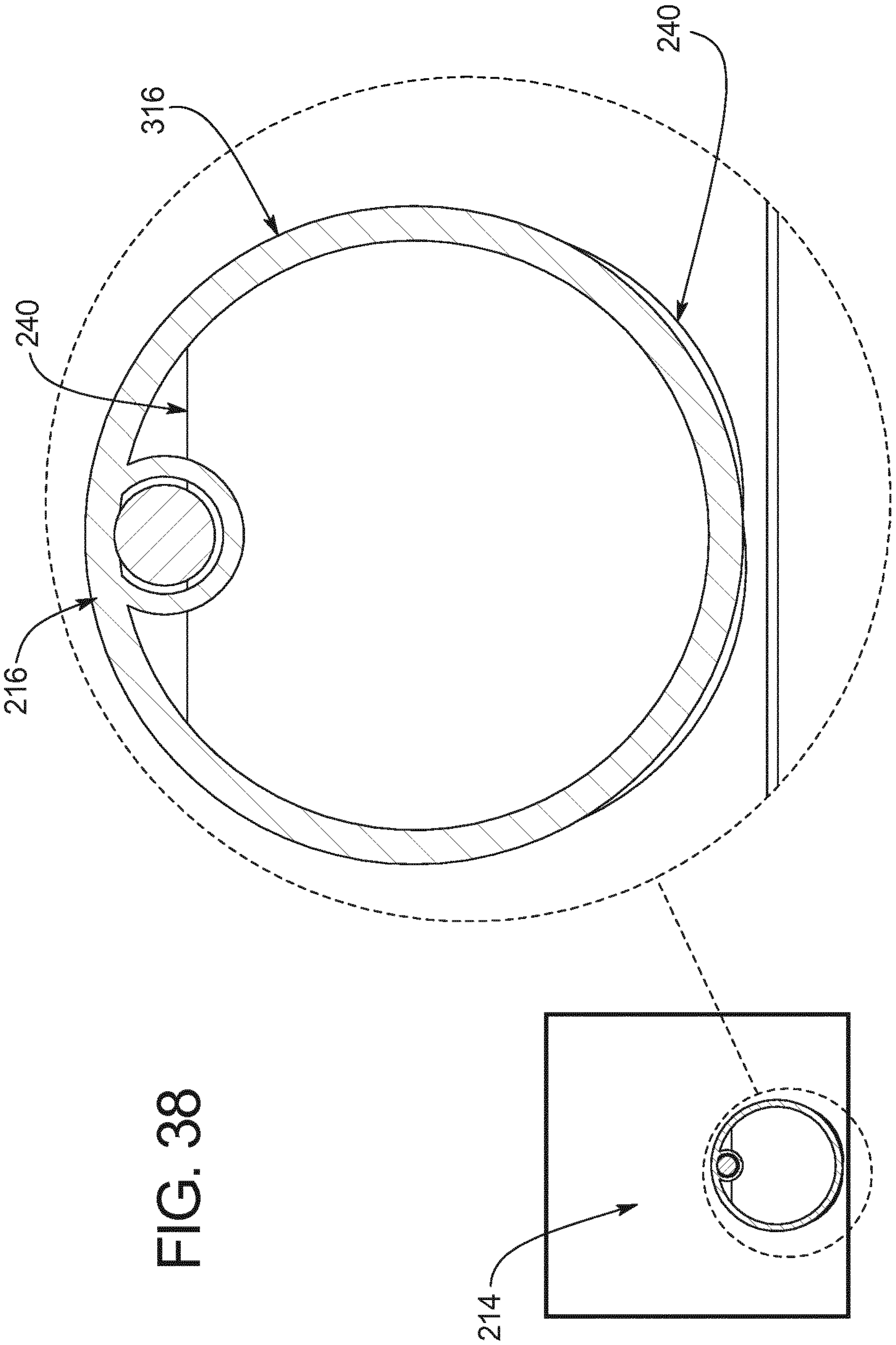
FIG. 38 is an above plan view comparing the spike profile of the second version of the second embodiment of the adapter to the hole in the container.
Figure 39:
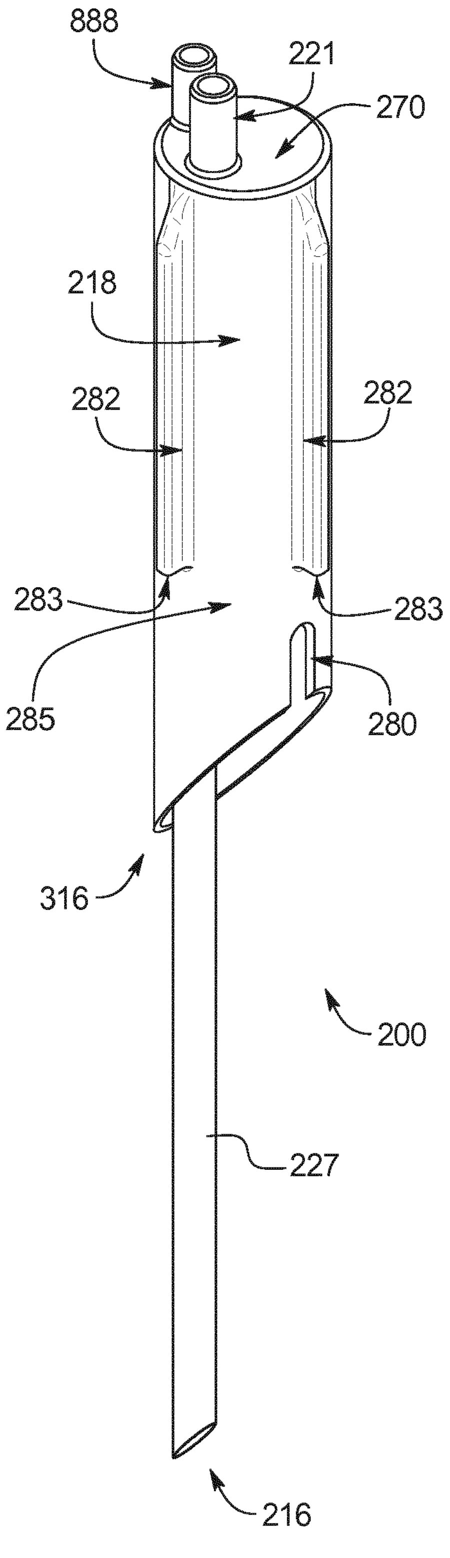
FIGS. 39-42 generally illustrate a variant of the second version of the second embodiment of the adapter, in which the adapter includes a leak indicator.
Figure 40:
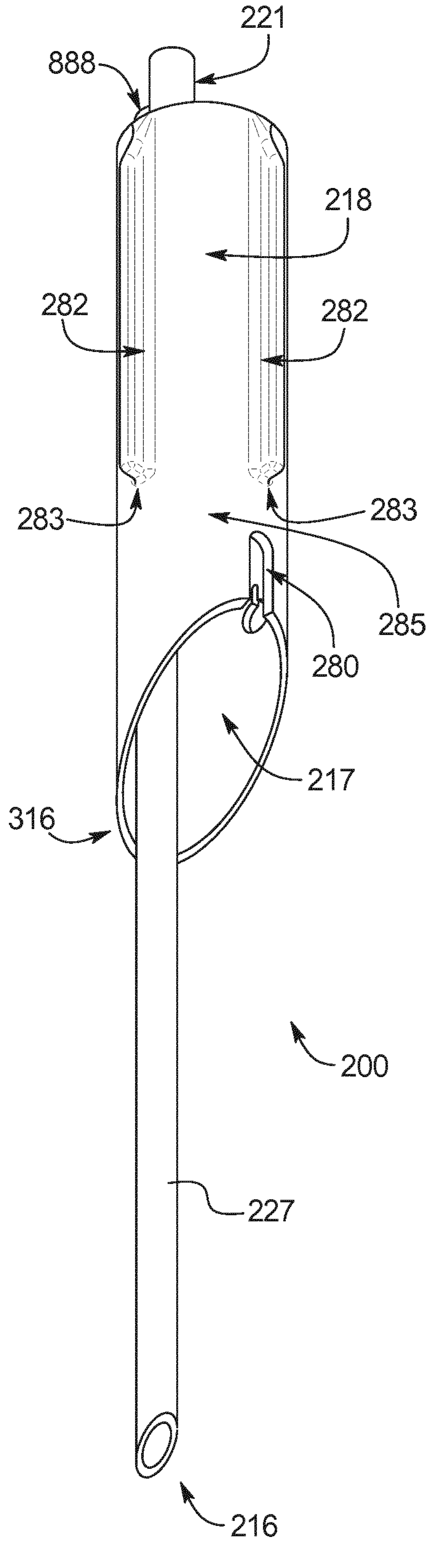
Figure 41:
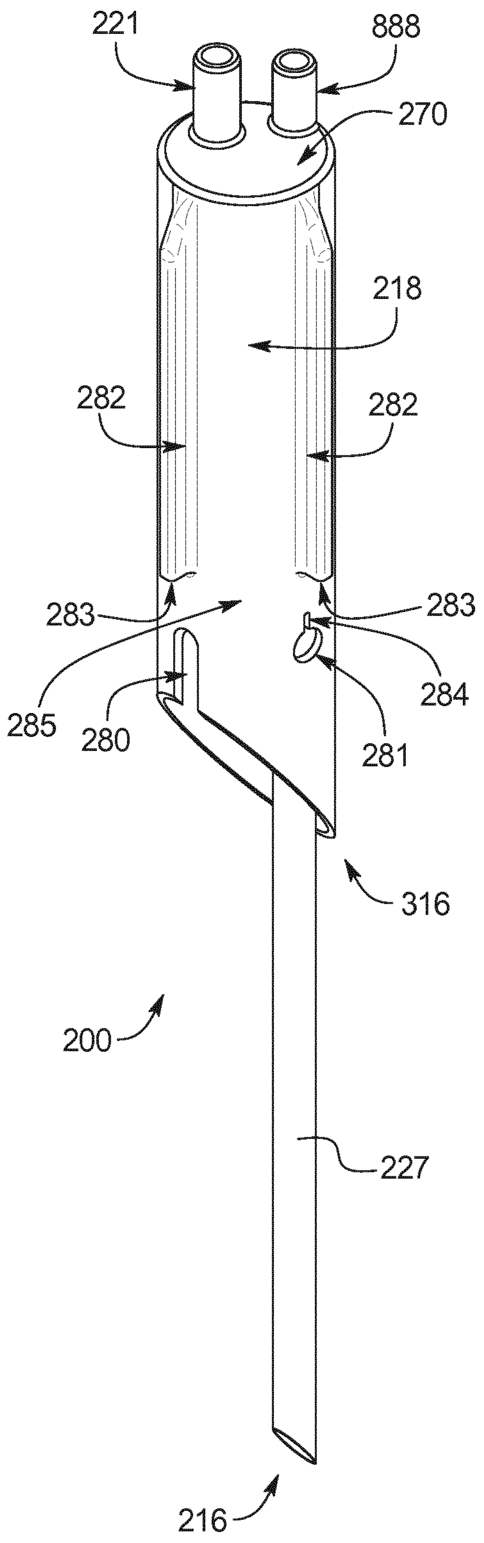
Figure 42:
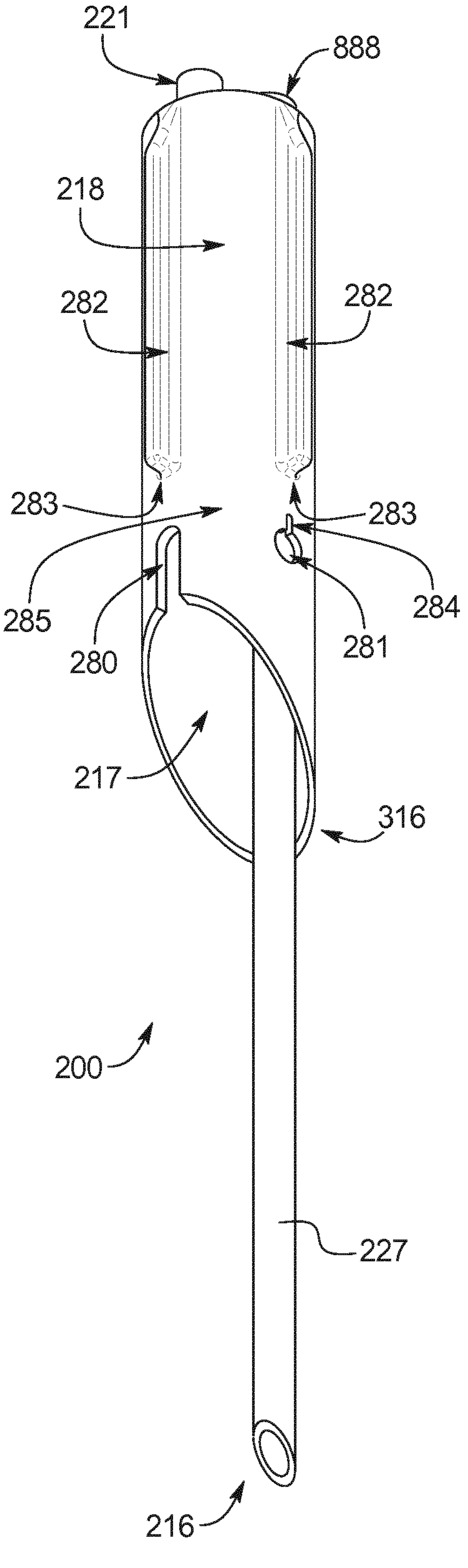
Figure 43:
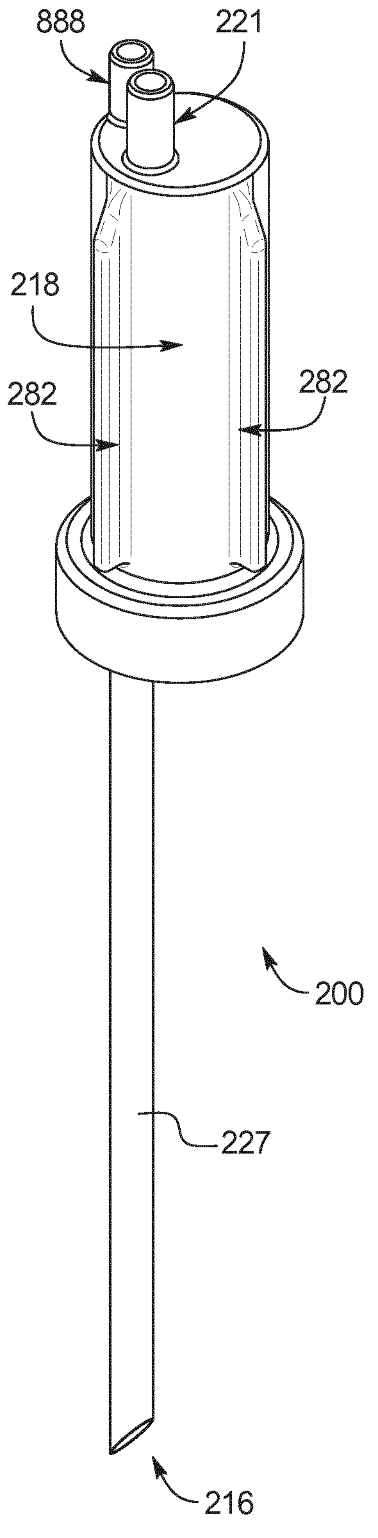
FIGS. 43-48 generally illustrate another variant of the second version of the second embodiment of the adapter, in which the adapter includes one or more threads for reversible connection to a threaded port of a container.
Figure 44:
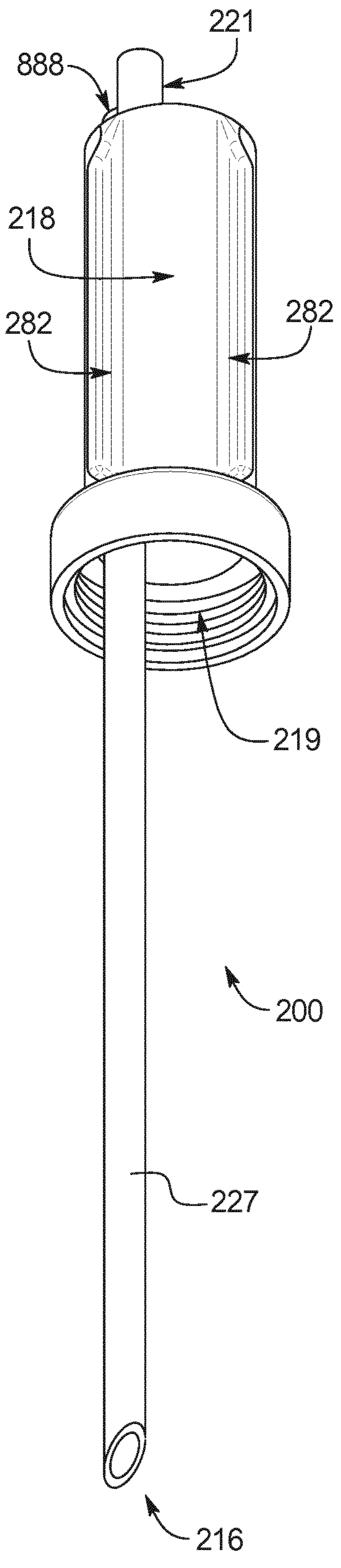
Figure 45:
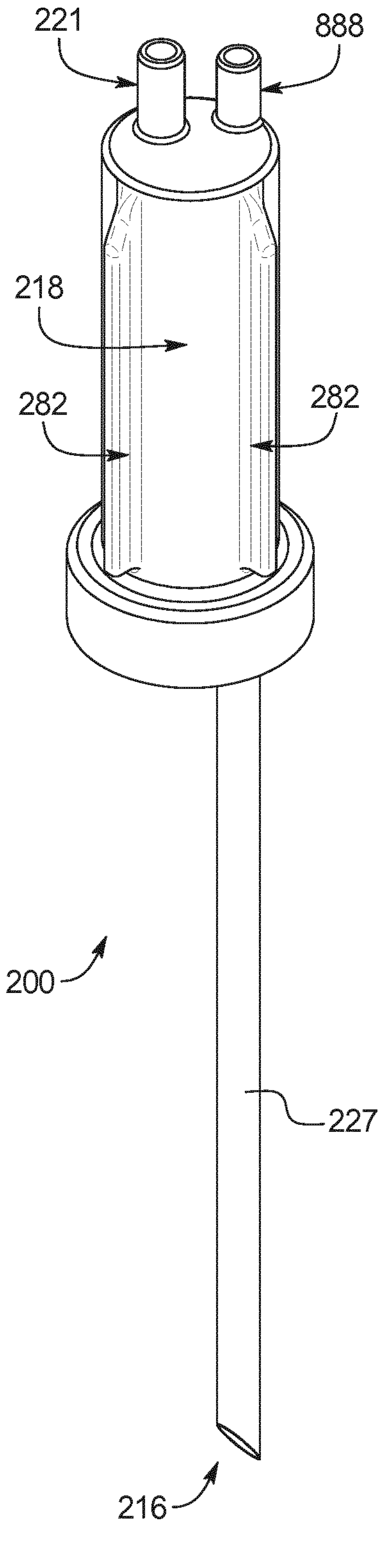
Figure 46:
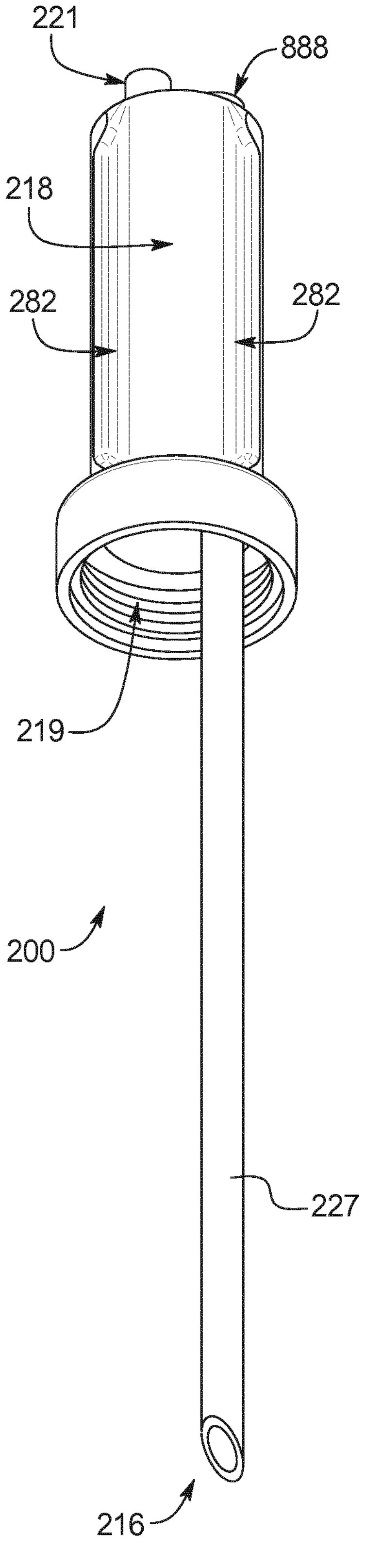
Figure 47:
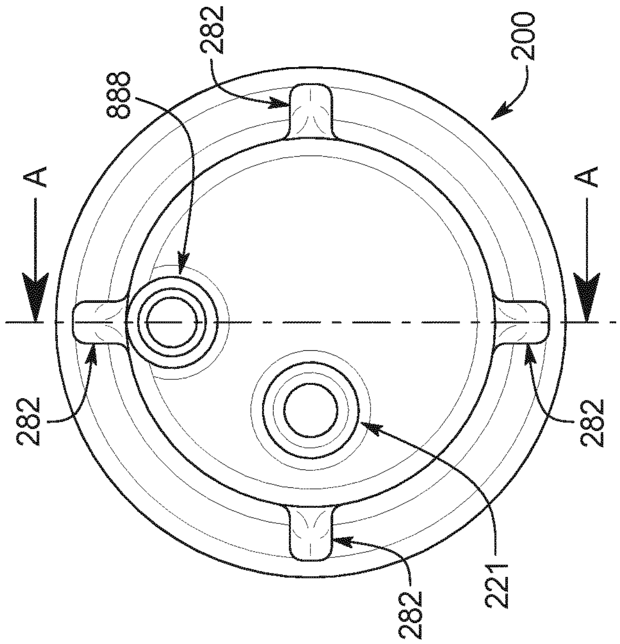
Figure 48:
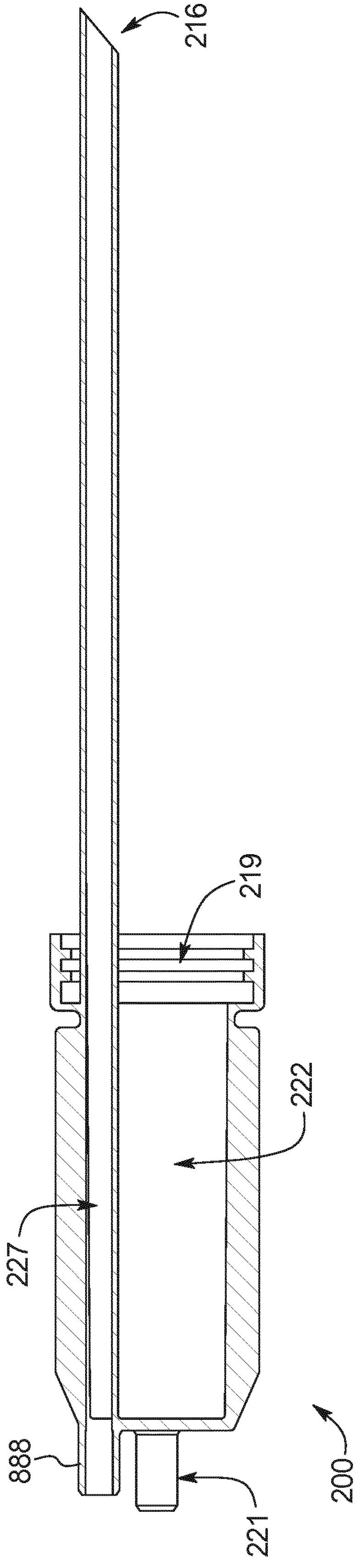

As shown in FIG. 38, the short spike 316 preferably has a profile larger than the pre-formed hole 240 in the container 214 into which the short spike 316 is inserted (i.e., larger in at least one dimension). Thus the short spike 316 can enlarge the hole 240 and preferably also forms a fluid-tight seal on the hole 240.

The container 214 can be inverted by a user. As shown in FIGS. 35A-38, the adapter 200 can place the interior of the container 114 in fluid communication with the enteral feeding line 212 via the adapter 200 (e.g., via the opening in the bottom end 217 of the body 218, the internal chamber 222, and the fluid exit port 221).

The composition 215 can be directed through the adapter 200 into the enteral feeding line 212 by gravity and/or by applying pressure to the container 214, for example by squeezing the container 214 (e.g., without the use of a pump). The composition 215 can travel into the patient through the enteral feeding line 212.

The vent tube 227 is preferably long enough that it is positioned in the air gap of the container 214 when the container 214 is inverted by a user (FIG. 35B). Further in this regard, the internal chamber 222, when filled, preferably will increase the volume of the air gap and minimize fluid entering the vent tube 227.

Preferably one or more parts of the adapter 200 (e.g., the body 218) can be transparent to allow a user to observe the flow of the composition 215 into the adapter 200 before entering the enteral feeding line 212.

In some embodiments, feeding can be paused by disconnecting the adapter 200 from the container 214 or the feeding tube 212, capping the container 214 or the adapter 200, and storing the container 214 (e.g., refrigerating the container 214). Then feeding can be resumed at a later time by reconnecting the adapter 200 to the container 214 and the feeding tube 212. Preferably the adapter 200 is reusable, i.e., another container can be used for enteral administration using the same adapter 200 after cleaning of the adapter 200. Further in this regard, the friction seal achieved by the adapter 200 can allow it to be reusable with minimal, if any, loss of connectivity for a container such as a laminated paper container. Nevertheless, in some embodiments the adapter 200 can be a single use device discarded after its application to the container 214.

The second embodiment (e.g., the adapter 200) can be used with minimal exertion of motor skills, can provide visualization of flow, can provide reliable flow, and can avoid adhesive or filter costs, as a result of the features disclosed herein. Furthermore, the adapter 200 can allow feeding to be delayed and finished later without irreversible membrane clogging.

FIGS. 39-42 generally illustrate a version of the second embodiment in which the adapter 200 has a leak indicator 284, e.g., a slot extending from drain hole 281. FIGS. 43-48 generally illustrate an embodiment in which the adapter 200 has threads 219 in the body 218 that can reversibly connect to corresponding threads on the container 214.

Figure 49:
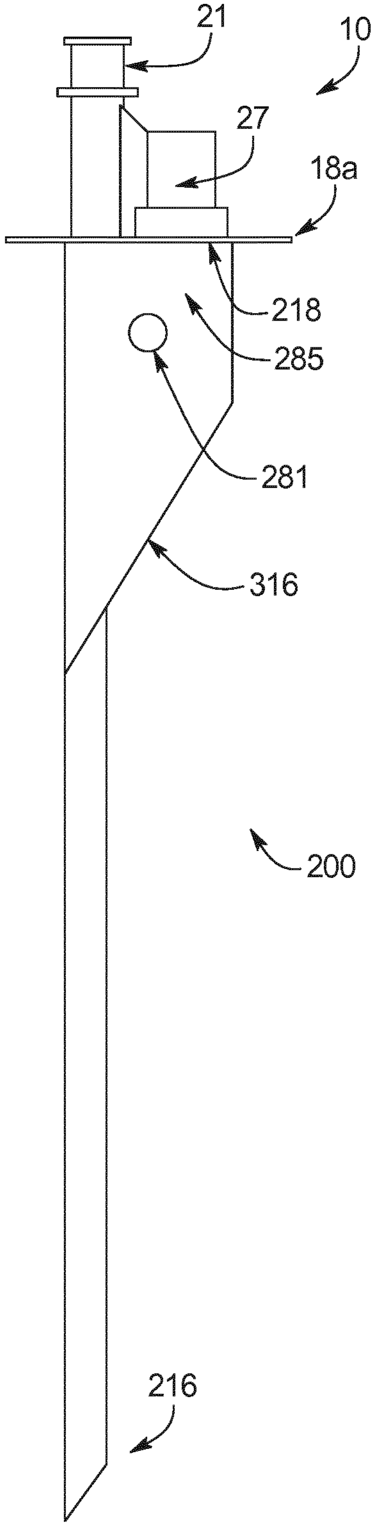
FIG. 49 generally illustrates a combination of the first and second embodiments of the adapter.

In an aspect of the present disclosure shown in FIG. 49, the first and second embodiments 100, 200 can be combined. In this regard, the body 218 can comprise an upper portion 10 comprising one or more of a fluid exit port 121 (e.g., the fluid exit port 121), a vent port 27 (e.g., the vent port 127), and one or more plates 18 (e.g., a first plate 18*a*).

The various embodiments of the adapter disclosed herein (e.g., the first and second embodiments, each version thereof, and combinations thereof) may be made from a plastic or polymeric material, including but not limited to polyolefin, e.g., polypropylene or polyethylene, and may be manufactured by molding technology, e.g., by injection molding. The adapter 10 preferably is made from a material that has low permeability to oxygen. Furthermore, the adapter 10 may be sterilizable, e.g., retortable or sterilizable by one or more of ethyleneoxide (ETO), gamma-radiation, beta-radiation, peroxide or any other suitable agent known to one skilled in the art.

Various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. An adapter for fluidly connecting a syringe to a container containing a composition, the syringe coupled to an enteral feeding line, the adapter comprising:

a body comprising a bottom end that defines an opening and a spike;

a fluid exit port extending from a top end of the body, the top end facing an opposite direction from the bottom end, the body comprising an internal chamber that fluidly connects the opening to the fluid exit port, the fluid exit port configured to direct the composition to the syringe coupled to the enteral feeding line; and one or more interface surfaces extending radially from the body, each interface surface comprising a rib, each rib extending along a longitudinal axis of the body and being configured to create a vent gap between the syringe and a portion of the body between ribs when the adapter is inserted into the syringe, wherein the vent gap is configured to allow the syringe to drain, wherein each rib extends from the top end of the body and comprises a stop surface at a lower-most end of the rib, and wherein the plurality of stop surfaces is configured to abut the container.

2. The adapter of claim 1, wherein the bottom end comprises a wall that forms the spike and also defines at least a portion of the opening.

3. The adapter of claim 1, wherein the opening of the body lies in a plane positioned at an angle between ten degrees and eighty degrees relative to at least one of (i) a side wall of the body or (ii) the longitudinal axis of the body.

4. The adapter of claim 1, wherein the body is cylindrical.

5. The adapter of claim 1, wherein at least a portion of the body is transparent.

6. A kit comprising the adapter of claim 1 and further comprising at least one of (i) the container containing the composition or (ii) the syringe.

7. The adapter of claim 1, wherein each rib is configured to abut the syringe.

8. The adapter of claim 1, wherein the one or more interface surfaces taper outward.

9. The adapter of claim 1, wherein the adapter further comprises a vent port, wherein the vent port comprises a filter configured to allow air to pass through the vent port and to prevent the composition from exiting through the vent port.

10. The adapter of claim 9, wherein the filter comprises a bacterial filter configured to prevent contaminants from passing through the vent port.

* * * * *